US012641520B2

(12) United States Patent
Zhang

(10) Patent No.: US 12,641,520 B2
(45) Date of Patent: May 26, 2026

(54) METHOD AND APPARATUS FOR ACCESS CONTROL USING ACCESS CONTROL PARAMETER SETS AND AUXILIARY TO DETERMINE AN ACCESS BARRING PROBABILITY

(71) Applicant: Huawei Technologies Co., Ltd., Shenzhen (CN)

(72) Inventor: Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 18/178,071

(22) Filed: Mar. 3, 2023

(65) Prior Publication Data

US 2023/0209442 A1 Jun. 29, 2023

Related U.S. Application Data

(63) Continuation of application No. PCT/CN2021/108492, filed on Jul. 26, 2021.

(30) Foreign Application Priority Data

Sep. 4, 2020 (CN) .......................... 202010921252.3
Sep. 30, 2020 (CN) .......................... 202011066491.1

(51) Int. Cl.
H04W 48/00 (2009.01)
H04W 48/02 (2009.01)
H04W 48/16 (2009.01)

(52) U.S. Cl.
CPC ........... *H04W 48/02* (2013.01); *H04W 48/16* (2013.01)

(58) Field of Classification Search
CPC ...... H04W 48/02; H04W 48/16; H04W 48/12
See application file for complete search history.

(56) References Cited

U.S. PATENT DOCUMENTS 10,432,617 B2 * 10/2019 Gerber ................. G06Q 20/385
2009/0270104 A1 * 10/2009 Du ......................... H04W 48/02
455/436

(Continued)

FOREIGN PATENT DOCUMENTS

CN 102045810 A 5/2011
CN 107018555 A 8/2017

(Continued)

OTHER PUBLICATIONS

3GPP TS 22.011 V17.1.0 (Mar. 2020), 3rd Generation Partnership Project; Technical Specification Group Services and System Aspects; Service accessibility (Release 17), total 34 pages.

(Continued)

*Primary Examiner* — Pakee Fang
(74) *Attorney, Agent, or Firm* — Slater Matsil, LLP

(57) ABSTRACT

A method includes: determining an access identity of a terminal device based on an access class of the terminal device, where the access identity is determined based on the access class, the access class is one of an access class 0 to an access class 9, and the access class 0 to the access class 9 correspond to one or more of the following access identities: an access identity 3 to an access identity 10, or H access identities whose access identity numbers are greater than or equal to 16, where H is a positive integer; determining, based on the access identity, that the terminal device applies a first access control parameter set; and determining, based on the first access control parameter set, whether the terminal device is allowed to access a first cell. An access class allocated to the terminal device corresponds to a new access identity.

20 Claims, 4 Drawing Sheets

(56) References Cited

U.S. PATENT DOCUMENTS

| | | | | |
|---|---|---|---|---|
| 2015/0141007 A1* | 5/2015 | Du | | H04W 48/16 |
| | | | | 455/434 |
| 2016/0057692 A1* | 2/2016 | Geng | | H04W 48/02 |
| | | | | 370/329 |
| 2021/0076303 A1* | 3/2021 | Liang | | H04W 48/02 |
| 2022/0217507 A1* | 7/2022 | Wang | | H04W 48/02 |
| 2022/0272606 A1* | 8/2022 | Wang | | H04W 48/02 |
| 2023/0164681 A1* | 5/2023 | Chen | | H04W 48/16 |
| | | | | 455/434 |

FOREIGN PATENT DOCUMENTS

| | | |
|---|---|---|
| CN | 108574973 A | 9/2018 |
| CN | 109803317 A | 5/2019 |
| JP | 2016522615 A | 7/2016 |
| WO | 2019218926 A1 | 11/2019 |

OTHER PUBLICATIONS

Huawei et al, R2-1912618, "Unified access control for NB-IoT and eMTC connected to 5GC", 3GPP tsg_ran\wg2_rl2, 20191004, Oct. 14-18, 2019, total 15 pages.

Xiaomi Communications, Discussion on Identification and UE access restrictions for Redcap devices [online], 3GPP TSG RAN WG2 #111-e R2-2006734, Internet URL:https://www.3gpp.org/ftp/tsg_ran/WG2_RL2/TSGR2_111-e/Docs/R2-2006734.zip, Aug. 17-28, 2020, total 4 pages.

3GPP TS 22.261 V17.3.0 (Jul. 2020), 3rd Generation Partnership Project; Technical Specification Group Services and System Aspects; Service requirements for the 5G system; Stage 1 (Release 17), total 83 pages.

* cited by examiner

```
┌──────────────┐                              ┌──────────────────┐
│      UE      │                              │  Network device  │
└──────────────┘                              └──────────────────┘
        │                                              │
        │  S31: At least one access control parameter set
        │◄─────────────────────────────────────────────│
┌───────────────────────┐                              │
│  S32: Determine, based on                             │
│   an access identity of the                           │
│   UE, that the UE applies a                           │
│   first access control                                │
│  parameter set in the at least                        │
│    one access control                                 │
│      parameter set                                    │
└───────────────────────┘                              │
        │  S33: Auxiliary parameter set                 │
        │◄ ─ ─ ─ ─ ─ ─ ─ ─ ─ ─ ─ ─ ─ ─ ─ ─ ─ ─ ─ ─ ─ ─│
┌───────────────────────┐                              │
│  S34: Determine, based on                             │
│   the first access control                            │
│  parameter set, whether the                           │
│   UE is allowed to access a                           │
│   first cell, or determine,                           │
│   based on the first access                           │
│  control parameter set and                            │
│  the auxiliary parameter set,                         │
│  whether the UE is allowed                            │
│    to access a first cell                             │
└───────────────────────┘                              │
        │                                              │
```

FIG. 3

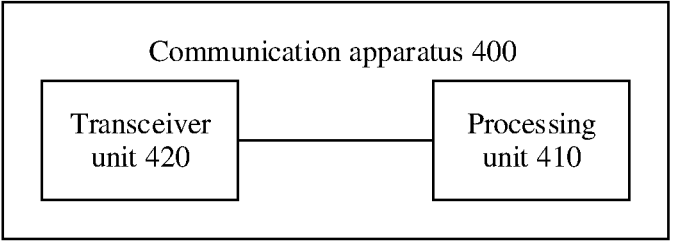

Communication apparatus 400

Transceiver unit 420 —————— Processing unit 410

FIG. 4

METHOD AND APPARATUS FOR ACCESS CONTROL USING ACCESS CONTROL PARAMETER SETS AND AUXILIARY TO DETERMINE AN ACCESS BARRING PROBABILITY

CROSS-REFERENCE TO RELATED APPLICATIONS

This application is a continuation of International Application No. PCT/CN2021/108492, filed on Jul. 26, 2021, which claims priority to Chinese Patent Application No. 202010921252.3, filed on Sep. 4, 2020, and Chinese Patent Application No. 202011066491.1, filed on Sep. 30, 2020. All of the aforementioned patent applications are hereby incorporated by reference in their entireties.

TECHNICAL FIELD

This application relates to the field of communication technologies, and in particular, to a communication method and a device.

BACKGROUND

In a current NR standard, a network side controls access of user equipment (UE) by using a unified access control (UAC) technology. UAC-related concepts include access class, access identity, and access category.

Each UE is allocated with a corresponding access class. Usually, an access class is written into a subscriber identity module (SIM) card. In this case, if UE is installed with a SIM card, an access class of the UE can be determined. There is a correspondence between an access class and an access identity, and the correspondence may be specified by using a standard. A cell may broadcast an access control parameter by using a system information block 1 (SIB1). The access control parameter corresponds to an access category, and the access category may be determined based on a service. In addition, each set of access control parameters has an applicable access identity. Therefore, UE may determine an applicable access control parameter based on an access identity of the UE and a service performed by the UE, so as to determine, based on the access control parameter, whether the UE is allowed to access the cell.

Currently, for a common user, an allocated access class is one of an access class 0 to an access class 9. In most cases, for the common user, a corresponding access identity is the access identity 0. In this case, when access control is performed on common UE, a same set of access control parameters may be used for performing control. In this manner, different UEs cannot be distinguished, or access control cannot be separately performed on different UEs.

SUMMARY

Embodiments of this application provide a communication method and a device, to separately perform access control on different terminal devices.

According to a first aspect, a first communication method is provided. The method may be performed by a terminal device, or may be performed by a chip system. The method includes: determining, based on an access identity of the terminal device, that the terminal device applies a first access control parameter set, where the access identity of the terminal device is determined based on an access class of the terminal device, the access class of the terminal device is one of an access class 0 to an access class 9, and the access class 0 to the access class 9 correspond to one or more of the following access identities: an access identity 3 to an access identity 10, or H access identities whose access identity numbers are greater than or equal to 16, where H is a positive integer; and determining, based on the first access control parameter set, whether the terminal device is allowed to access a first cell, where the first cell is a cell in which the terminal device receives the first access control parameter set.

In this embodiment of this application, the access class allocated to the terminal device is one of the access class 0 to the access class 9. However, these access classes correspond to new access identities. Correspondingly, different access classes (or different access identities) are applicable to different access control parameters. Therefore, when access control is performed on these terminal devices, different access control parameters may be applied to different terminal devices for separate access control, to implement differentiated control at a finer granularity. For example, a terminal device required by a network or a terminal device that more needs to access a network can preferentially access the network, thereby meeting requirements of the terminal device and the network.

With reference to the first aspect, in a first optional implementation of the first aspect, the determining, based on an access category and an access identity of the terminal device, that the terminal device applies a first access control parameter set includes: determining, based on an access category and the access identity of the terminal device, that the terminal device applies the first access control parameter set.

The terminal device may determine, based on the access identity and the access category of the terminal device, that the terminal device applies the first access control parameter set, or may determine, based on the access identity without using the access category, that the terminal device applies the first access control parameter set.

With reference to the first aspect or the first optional implementation of the first aspect, in a second optional implementation of the first aspect, a first terminal device belongs to a first type, terminal devices of a same type have a same access class, and terminal devices of different types meet one or more of the following conditions:

the terminal devices of different types support different bandwidths;

the terminal devices of different types support different quantities of antennas;

the terminal devices of different types have different application scenarios;

the terminal devices of different types support different maximum data transmission rates; or the terminal devices of different types support different maximum transport block sizes.

In this embodiment of this application, the terminal device may be classified into a plurality of different categories, and there may be a plurality of classification factors. For example, the terminal device may be classified based on a bandwidth supported by the terminal device, or based on an antenna quantity supported by the terminal device, or based on a bandwidth supported by the terminal device and an application scenario. In this embodiment of this application, all terminal devices participating in category classification are, for example, redcap terminal devices, or may include another terminal device, for example, may include a legacy terminal device.

With reference to the first aspect, the first optional implementation of the first aspect, or the second optional implementation of the first aspect, in a third optional implementation of the first aspect, the method further includes: receiving a first message, where the first message includes first indication information and at least one auxiliary parameter set, the first indication information is used to: indicate that an auxiliary parameter set is configured for one or more access classes, or indicate that an auxiliary parameter set is configured for one or more access identities, and the at least one auxiliary parameter set includes all auxiliary parameter sets indicated by the first indication information; and determining, based on the first indication information, that the terminal device corresponds to a first auxiliary parameter set in the at least one auxiliary parameter set.

In this embodiment of this application, to better separately perform access control on terminal devices of different types, auxiliary parameter sets may be further configured for the terminal devices of different types, to further separately perform access control on the terminal devices of different types by using the auxiliary parameter sets. For example, in this embodiment of this application, an auxiliary parameter set is separately configured for one or more access classes, or an auxiliary parameter set is separately configured for one or more access identities. A network device needs to notify the terminal device of an access class for which the auxiliary parameter set is configured by the network device, or an access identity for which the auxiliary parameter set is configured by the network device. The network device may send first indication information, and indicate, by using the first indication information, an access identity for which the auxiliary parameter set is configured, or indicate an access class for which the auxiliary parameter set is configured, so that a terminal device can determine, based on the first indication, whether the auxiliary parameter set is configured for the terminal device. In this implementation, the network device may send the first indication information and the at least one auxiliary parameter set in one message. The message is, for example, a SIB1, or may be another message. Therefore, the terminal device can obtain the auxiliary parameter set and the first indication information by using one message, and there is no need to exchange many messages between the network device and the terminal device, which simplifies an implementation process.

With reference to the first aspect, the first optional implementation of the first aspect, or the second optional implementation of the first aspect, in a fourth optional implementation of the first aspect, the method further includes: receiving first indication information, where the first indication information is used to: indicate that an auxiliary parameter set is configured for one or more access classes, or indicate that an auxiliary parameter set is configured for one or more access identities; and determining, based on the first indication information, that the terminal device corresponds to a first auxiliary parameter set.

With reference to the third optional implementation of the first aspect or the fourth optional implementation of the first aspect, in a fifth optional implementation of the first aspect, the first indication information is used to indicate that an auxiliary parameter set is configured for each of the one or more access classes; the first indication information is used to indicate that an auxiliary parameter set is configured for each of the one or more access identities; the first indication information is used to indicate that one auxiliary parameter set is configured for the one or more access classes; or the first indication information is used to indicate that one auxiliary parameter set is configured for the one or more access identities.

In this embodiment of this application, one auxiliary parameter set may be configured for one access identity or access class, so that different auxiliary parameter sets may be configured for different access identities or access classes, to implement differentiated control on terminal devices with different access identities or access classes, so that a control granularity is finer. Alternatively, one auxiliary parameter set may be configured for a plurality of access identities or access classes. In this way, a configuration process can be simplified, and signaling overheads caused by sending the auxiliary parameter set can also be reduced.

With reference to the third optional implementation of the first aspect, the fourth optional implementation of the first aspect, or the fifth optional implementation of the first aspect, in a sixth optional implementation of the first aspect, the determining, based on the first access control parameter set, whether the terminal device is allowed to access a first cell includes: determining, based on the first access control parameter set and the first auxiliary parameter set, whether the terminal device is allowed to access the first cell.

If the terminal device applies the first auxiliary parameter set, the terminal device may determine, based on the first access control parameter set and the first auxiliary parameter set, whether the terminal device is allowed to access the first cell. In this way, differentiated control is implemented on terminal devices of different types by using the auxiliary parameter set.

With reference to the third optional implementation of the first aspect, the fourth optional implementation of the first aspect, the fifth optional implementation of the first aspect, or the sixth optional implementation of the first aspect, in a seventh optional implementation of the first aspect, the first auxiliary parameter set includes one or more of the following parameters: a probability factor, where the probability factor is used to adjust a barring factor, and the barring factor is included in the first access control parameter set; a time factor, where the time factor is used to adjust access barring time, and the access barring time is included in the first access control parameter set; dedicated random access resource information; and a first threshold, where the first threshold is a threshold of a first parameter, and the first parameter is used to indicate signal quality of the terminal device.

One auxiliary parameter set may include one or more of the foregoing parameters, or may further include another parameter.

With reference to the seventh optional implementation of the first aspect, in an eighth optional implementation of the first aspect, the method further includes: if it is determined that a value of the measured first parameter is less than the first threshold, using the first auxiliary parameter set.

For example, the first parameter is RSRP, RSRQ, or an SINR. If the value of the first parameter measured by the terminal device is less than the first threshold, the terminal device may use the first auxiliary parameter set. If the value of the first parameter measured by the terminal device is greater than or equal to the first threshold, the terminal device may not use the first auxiliary parameter set. In this manner, the auxiliary parameter set may be used by users whose signal quality is poor. For example, access of these users is restricted by using the auxiliary parameter set (for example, a probability factor is set to a relatively small value, signal quality of a set random access resource is relatively poor, or a quantity of random access resources is relatively small), so that more users whose signal quality is good can access a cell. In this way, access control can be separately performed on terminal devices of different types, and access control can be separately performed on terminal devices with different signal quality.

With reference to the fourth optional implementation of the first aspect, the fifth optional implementation of the first aspect, the sixth optional implementation of the first aspect, the seventh optional implementation of the first aspect, or the eighth optional implementation of the first aspect, in a ninth optional implementation of the first aspect, the method further includes: receiving at least one auxiliary parameter set, where the at least one auxiliary parameter set includes all auxiliary parameter sets indicated by the first indication information, and the at least one auxiliary parameter set includes the first auxiliary parameter set.

Alternatively, the network device may send the first indication information and the at least one auxiliary parameter set in different messages, to reduce an information amount of one message and improve a message sending success rate.

With reference to any one of the first aspect, or the first optional implementation of the first aspect to the ninth optional implementation of the first aspect, in a tenth optional implementation of the first aspect, the first access control parameter set includes second indication information, and the second indication information is used to indicate an access identity to which the first access control parameter is applicable.

For example, an access control parameter set is not applicable to an access identity 0 by default, but includes second indication information. An access identity or access identities to which the access control parameter set is applicable may be indicated by using the second indication information. A terminal device can determine, based on an access identity of the terminal device and the second indication information, whether the terminal device applies the access control parameter set. The second indication information is improved, and an access identity to which an access control parameter set is applicable is extended, so that the access control parameter set is applied more properly.

With reference to any one of the first aspect, or the first optional implementation of the first aspect to the tenth optional implementation of the first aspect, in an eleventh optional implementation of the first aspect, the first access control parameter set belongs to a first set, the first set further includes a second access control parameter set, the first set further includes third indication information corresponding to the first access control parameter set and fourth indication information corresponding to the second access control parameter set, the third indication information is used to indicate an access identity to which the first access control parameter set is applicable, and the fourth indication information is used to indicate an access identity to which the second access control parameter set is applicable.

This manner is equivalent to extending content of an existing access control parameter set. Although one access control parameter set (or one set) corresponds to one access category, access control parameter sets applicable to different access identities may also be provided for one access category, which is more conducive to implementing refined access control.

With reference to any one of the first aspect, or the first optional implementation of the first aspect to the eleventh optional implementation of the first aspect, in a twelfth optional implementation of the first aspect, the access class of the terminal device is an access class of a first category, and the access class of the first category is configured for a redcap terminal device.

The terminal device described in this embodiment of this application is, for example, the redcap terminal device, or may include another type of terminal device, for example, a legacy terminal device.

According to a second aspect, a second communication method is provided. The method may be performed by a network device, or may be performed by a chip system. For example, the network device is an access network device such as a base station. The method includes: determining at least one access control parameter set, where the at least one access control parameter set is used to determine whether a terminal device is allowed to access a first cell, an access identity of the terminal device is determined based on an access class of the terminal device, the access class of the terminal device is one of an access class 0 to an access class 9, and the access class 0 to the access class 9 correspond to one or more of the following access identities: an access identity 3 to an access identity 10, or H access identities whose access identity numbers are greater than or equal to 16, where H is a positive integer; and sending the at least one access control parameter set; and sending the at least one access control parameter set.

With reference to the second aspect, in a first optional implementation of the second aspect, different access classes correspond to different types of terminal devices, and access classes of terminal devices of a same type are the same. The terminal devices of different types meet one or more of the following: The terminal devices of different types support different bandwidths; the terminal devices of different types support different quantities of antennas; the terminal devices of different types have different application scenarios; the terminal devices of different types support different maximum data transmission rates; or the terminal devices of different types support different maximum transport block sizes.

With reference to the second aspect or the first optional implementation of the second aspect, in a second optional implementation of the second aspect, the method further includes: sending a first message, where the first message includes first indication information and at least one auxiliary parameter set, the first indication information is used to: indicate that an auxiliary parameter set is configured for one or more access classes, or indicate that an auxiliary parameter set is configured for one or more access identities, and the at least one auxiliary parameter set includes all auxiliary parameter sets indicated by the first indication information.

With reference to the second aspect or the first optional implementation of the second aspect, in a third optional implementation of the second aspect, the method further includes: sending first indication information, where the first indication information is used to: indicate that an auxiliary parameter set is configured for one or more access classes, or indicate that an auxiliary parameter set is configured for one or more access identities.

With reference to the second optional implementation of the second aspect or the third optional implementation of the second aspect, in a fourth optional implementation of the second aspect, the first indication information is used to indicate that an auxiliary parameter set is configured for each of the one or more access classes; the first indication information is used to indicate that an auxiliary parameter set is configured for each of the one or more access identities; the first indication information is used to indicate that one auxiliary parameter set is configured for the one or more access classes; or the first indication information is used to indicate that one auxiliary parameter set is configured for the one or more access identities.

With reference to the second optional implementation of the second aspect, the third optional implementation of the second aspect, or the fourth optional implementation of the second aspect, in a fifth optional implementation of the second aspect, one auxiliary parameter set in the at least one auxiliary parameter set includes one or more of the following parameters: a probability factor, where the probability factor is used to adjust a barring factor, and the barring factor is included in the first access control parameter set; a time factor, where the time factor is used to adjust access barring time, and the access barring time is included in the first access control parameter set; dedicated random access resource information; or a first threshold, where the first threshold is a threshold of a first parameter, and the first parameter is used to indicate signal quality of the terminal device.

With reference to the third optional implementation of the second aspect, the fourth optional implementation of the second aspect, or the fifth optional implementation of the second aspect, in a sixth optional implementation of the second aspect, the method further includes: sending the at least one auxiliary parameter set, where the at least one auxiliary parameter set includes all auxiliary parameter sets indicated by the first indication information, and the at least one auxiliary parameter set includes the first auxiliary parameter set.

With reference to any one of the second aspect, or the first optional implementation of the second aspect to the sixth optional implementation of the second aspect, in a seventh optional implementation of the second aspect, the first access control parameter set in the at least one access control parameter set includes second indication information, and the second indication information is used to indicate an access identity to which the first access control parameter is applicable.

With reference to any one of the second aspect, or the first optional implementation of the second aspect to the sixth optional implementation of the second aspect, in an eighth optional implementation of the second aspect, the at least one access control parameter set includes a first access control parameter set and a second access control parameter set, the first access control parameter set and the second access control parameter set belong to a first set, the first set further includes third indication information corresponding to the first access control parameter set and fourth indication information corresponding to the second access control parameter set, the third indication information is used to indicate an access identity to which the first access control parameter set is applicable, and the fourth indication information is used to indicate an access identity to which the second access control parameter set is applicable.

With reference to any one of the second aspect, or the first optional implementation of the second aspect to the eighth optional implementation of the second aspect, in a ninth optional implementation of the second aspect, the access class of the terminal device is an access class of a first category, and the access class of the first category is configured for a redcap terminal device.

For technical effects brought by the second aspect or the optional implementations of the second aspect, refer to the descriptions of the technical effects brought by the first aspect or the corresponding implementations.

According to a third aspect, a third communication method is provided. The method may be performed by a terminal device, or may be performed by a chip system. The method includes: receiving at least one access control parameter set and an auxiliary parameter set; determining, based on an access identity of the terminal device, that the terminal device corresponds to a first access control parameter set in the at least one access control parameter set; and determining, based on the first access control parameter set and the auxiliary parameter set, whether the terminal device is allowed to access a first cell.

In this embodiment of this application, an auxiliary parameter set may be configured for some terminal devices. For example, an auxiliary parameter set is configured for a redcap terminal device, so that the redcap terminal device can determine, by using the auxiliary parameter set, whether the redcap terminal device is allowed to access a cell. In this way, access control is separately performed on the redcap terminal device and a legacy terminal device, so that a control granularity is finer.

With reference to the third aspect, in a first optional implementation of the third aspect, the determining, based on an access category and an access identity of the terminal device, that the terminal device applies a first access control parameter set includes: determining, based on an access category and the access identity of the terminal device, that the terminal device applies the first access control parameter set.

With reference to the third aspect or the first optional implementation of the third aspect, in a second optional implementation of the third aspect, the auxiliary parameter set includes one or more of the following parameters: a probability factor, where the probability factor is used to adjust a barring factor, and the barring factor is included in the first access control parameter set; a time factor, where the time factor is used to adjust access barring time, and the access barring time is included in the first access control parameter set; dedicated random access resource information; or a first threshold, where the first threshold is a threshold of a first parameter, and the first parameter is used to indicate signal quality of the terminal device.

With reference to the second optional implementation of the third aspect, in a third optional implementation of the third aspect, the method further includes: if it is determined that a value of the measured first parameter is less than the first threshold, using the auxiliary parameter set.

With reference to the second optional implementation of the third aspect or the third optional implementation of the third aspect, in a fourth optional implementation of the third aspect, the determining, based on the first access control parameter set and the auxiliary parameter set, whether the terminal device is allowed to access a first cell includes: adjusting the barring factor by using the probability factor; generating a random number, and if the random number is less than an adjusted barring factor, determining that the terminal device is allowed to access the first cell, or if the random number is greater than or equal to an adjusted barring factor, determining that the terminal device is barred from accessing the first cell; and if the terminal device is barred from accessing the first cell, starting a timer, where timing duration of the timer is duration obtained after the access barring time is adjusted based on the time factor, and the terminal device is barred from accessing the first cell before the timer expires.

A parameter included in the auxiliary parameter set may be used to adjust a corresponding parameter included in the access control parameter set, to implement access control on different types of UEs.

With reference to any one of the third aspect, or the first optional implementation of the third aspect to the fourth optional implementation of the third aspect, in a fifth optional implementation of the third aspect, an access class of the terminal device is one of an access class 0 to an access class 9.

In this embodiment of this application, a new access class may not be configured for the terminal device, provided that the terminal device applies an original access class. This makes the solutions in this embodiment of this application more compatible with the conventional technology. Alternatively, a new access class may be configured for the terminal device, for example, one of the access class 0 to the access class 9 is configured.

With reference to any one of the third aspect, or the first optional implementation of the third aspect to the fifth optional implementation of the third aspect, in a sixth optional implementation of the third aspect, an access identity of the terminal device is one of an access identity 3 to an access identity 10, or one of H access identities whose access identity numbers are greater than or equal to 16, where H is a positive integer.

With reference to any one of the third aspect, or the first optional implementation of the third aspect to the sixth optional implementation of the third aspect, in a seventh optional implementation of the third aspect, the method further includes: determining, based on capability information of the terminal device, that the terminal device applies the auxiliary parameter set; determining, based on the access class of the terminal device, that the terminal device applies the auxiliary parameter set, where the access class of the terminal device is an access class of a first category, and in the access class of the first category, different access classes correspond to a same auxiliary parameter set or different auxiliary parameter sets in the auxiliary parameter set; or determining, based on the access identity of the terminal device, that the terminal device applies the auxiliary parameter set, where the access identity of the terminal device is an access identity of a first category, in the access identity of the first category, different access identities correspond to a same auxiliary parameter set or different auxiliary parameter sets in the auxiliary parameter set, and the access identity of the first category includes one or more of the following: the access identity 3 to the access identity 10, or the H access identities whose access identity numbers are greater than or equal to 16, where H is a positive integer.

The terminal device may determine, in different manners, whether the terminal device applies the auxiliary parameter set. For example, the terminal device may determine, based on a capability of the terminal device, that the auxiliary parameter set is applicable to the terminal device. For example, it is specified that the auxiliary parameter set is applicable to a terminal device with a first capability, but the auxiliary parameter set is not applicable to a terminal device with another capability. In this case, the terminal device with the first capability can use the auxiliary parameter set, and the terminal device with another capability does not use the auxiliary parameter set. The first capability includes, for example, an antenna capability or a bandwidth capability, and may further include another capability. Alternatively, in this embodiment of this application, a new access class may be allocated to the terminal device. If a new access class is configured for a terminal device, the terminal device applies the auxiliary parameter set. Otherwise, the terminal device does not apply the auxiliary parameter set. Alternatively, in this embodiment of this application, a new access identity may be allocated to the terminal device. If a new access identity is configured for a terminal device, the terminal device applies the auxiliary parameter set. Otherwise, the terminal device does not apply the auxiliary parameter set. It can be learned that in this embodiment of this application, the terminal device may determine, in a plurality of manners, whether the terminal device applies the auxiliary parameter set, which is relatively flexible.

For technical effects brought by some implementations of the third aspect, refer to descriptions of technical effects of corresponding implementations of the first aspect.

According to a fourth aspect, a fourth communication method is provided. The method may be performed by a network device, or may be performed by a chip system. For example, the network device is an access network device such as a base station. The method includes: determining at least one access control parameter set and determining an auxiliary parameter set, where the at least one access control parameter set and the auxiliary parameter set are used to determine whether a terminal device is allowed to access a first cell; and sending the at least one access control parameter set and the auxiliary parameter set.

With reference to the fourth aspect, in a first optional implementation of the fourth aspect, the auxiliary parameter set includes one or more of the following parameters: a probability factor, where the probability factor is used to adjust a barring factor, and the barring factor is included in the first access control parameter set; a time factor, where the time factor is used to adjust access barring time, and the access barring time is included in the first access control parameter set; dedicated random access resource information; or a first threshold, where the first threshold is a threshold of a first parameter, and the first parameter is used to indicate signal quality of the terminal device.

With reference to the first optional implementation of the fourth aspect, in a second optional implementation of the fourth aspect, the method further includes: if it is determined that a value of the measured first parameter is less than the first threshold, using the auxiliary parameter set.

With reference to the fourth aspect, the first optional implementation of the fourth aspect, or the second optional implementation of the fourth aspect, in a third optional implementation of the fourth aspect, an access class of the terminal device is one of an access class 0 to an access class 9.

With reference to the fourth aspect, the first optional implementation of the fourth aspect, or the third optional implementation of the fourth aspect, in a fourth optional implementation of the fourth aspect, an access identity of the terminal device is one of an access identity 3 to an access identity 10, or one of H access identities whose access identity numbers are greater than or equal to 16, where H is a positive integer.

With reference to the fourth aspect, the first optional implementation of the fourth aspect, the fourth optional implementation of the fourth aspect, or the third optional implementation of the fourth aspect, in a fifth optional implementation of the fourth aspect, the auxiliary parameter set corresponds to a first capability of the terminal device; or the auxiliary parameter set corresponds to an access class of a first category. In the access class of the first category, different access classes correspond to a same auxiliary parameter set or different auxiliary parameter sets in the auxiliary parameter set; or the auxiliary parameter set corresponds to an access identity of a first category. In the access identity of the first category, different access identities correspond to a same auxiliary parameter set or different auxiliary parameter sets in the auxiliary parameter set, and the access identity of the first category includes one or more of the following: the access identity 3 to the access identity 10, or the H access identities whose access identity numbers are greater than or equal to 16, where H is a positive integer.

For technical effects brought by some implementations of the fourth aspect, refer to descriptions of technical effects of corresponding implementations of the third aspect.

According to a fifth aspect, a communication apparatus is provided. The communication apparatus may include a module configured to perform the method according to any one of the first aspect or the optional implementations of the first aspect, for example, include a processing unit. Optionally, the communication apparatus may further include a transceiver unit. Optionally, the communication apparatus may further include a storage unit.

According to a sixth aspect, a communication apparatus is provided. The communication apparatus may include a module configured to perform the method according to any one of the second aspect or the optional implementations of the second aspect, for example, include a transceiver unit and a processing unit. Optionally, the communication apparatus may further include a storage unit.

According to a seventh aspect, a communication apparatus is provided. The communication apparatus may include a module configured to perform the method according to any one of the third aspect or the optional implementations of the third aspect, for example, include a transceiver unit and a processing unit. Optionally, the communication apparatus may further include a storage unit.

According to an eighth aspect, a communication apparatus is provided. The communication apparatus may include a module configured to perform the method according to any one of the fourth aspect or the optional implementations of the fourth aspect, for example, include a transceiver unit and a processing unit. Optionally, the communication apparatus may further include a storage unit.

According to a ninth aspect, a chip system is provided. The chip system includes one or more processors and includes a communication interface. The processor is coupled to the communication interface and is configured to implement the method provided in any one of the first aspect or the optional implementations of the first aspect. Optionally, the chip system may further include a memory. For example, the processor may read and execute a software program stored in the memory, to implement the method provided in any one of the first aspect or the optional implementations of the first aspect.

According to a tenth aspect, a chip system is provided. The chip system includes one or more processors and includes a communication interface. The processor is coupled to the communication interface and is configured to implement the method provided in any one of the second aspect or the optional implementations of the second aspect. Optionally, the chip system may further include a memory. For example, the processor may read and execute a software program stored in the memory, to implement the method provided in any one of the second aspect or the optional implementations of the second aspect.

According to an eleventh aspect, a chip system is provided. The chip system includes one or more processors and includes a communication interface. The processor is coupled to the communication interface and is configured to implement the method provided in any one of the third aspect or the optional implementations of the third aspect. Optionally, the chip system may further include a memory. For example, the processor may read and execute a software program stored in the memory, to implement the method provided in any one of the third aspect or the optional implementations of the third aspect.

According to a twelfth aspect, a chip system is provided. The chip system includes one or more processors and includes a communication interface. The processor is coupled to the communication interface and is configured to implement the method provided in any one of the fourth aspect or the optional implementations of the fourth aspect. Optionally, the chip system may further include a memory. For example, the processor may read and execute a software program stored in the memory, to implement the method provided in any one of the fourth aspect or the optional implementations of the fourth aspect.

According to a thirteenth aspect, a first communication system is provided. The first communication system includes the communication apparatus according to the fifth aspect or the chip system according to the ninth aspect, and includes the communication apparatus according to the sixth aspect or the chip system according to the tenth aspect.

According to a fourteenth aspect, a second communication system is provided. The first communication system includes the communication apparatus according to the seventh aspect or the chip system according to the eleventh aspect, and includes the communication apparatus according to the eighth aspect or the chip system according to the twelfth aspect.

According to a fifteenth aspect, a computer-readable storage medium is provided. The computer-readable storage medium is configured to store a computer program, and when the computer program is run on a computer, the computer is enabled to perform the method provided in any one of the foregoing aspects.

According to a sixteenth aspect, a computer program product including instructions is provided. The computer program product is configured to store a computer program. When the computer program is run on a computer, the computer is enabled to perform the method according to any one of the foregoing aspects.

In embodiments of this application, an access class allocated to a terminal device corresponds to at least two access identities. Correspondingly, different access classes (or different access identities) are applicable to different access control parameters, to implement differentiated control on terminal devices of different types.

BRIEF DESCRIPTION OF THE DRAWINGS

FIG. 3 is a flowchart of a second communication method according to an embodiment of this application;

FIG. 4 is a schematic block diagram of a communication apparatus according to an embodiment of this application.

DETAILED DESCRIPTION OF ILLUSTRATIVE EMBODIMENTS

Figure 1:
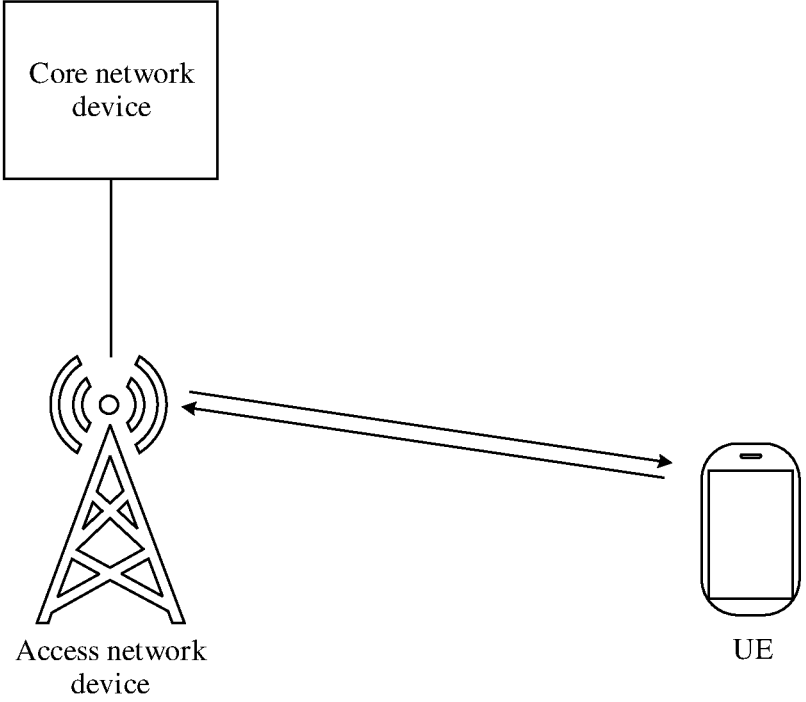
FIG. 1 is a schematic diagram of an application scenario according to an embodiment of this application.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

In embodiments of this application, a terminal device is a device having a wireless transceiver function, and may be a fixed device, a mobile device, a handheld device, a wearable device, or a vehicle-mounted device, or a wireless apparatus (for example, a communication module or a chip system) built in the foregoing device. The terminal device is configured to connect people, things, machines, and the like, and may be widely used in various scenarios, for example, including but not limited to the following scenarios: cellular communication, device-to-device (D2D) communication, vehicle to everything (V2X), machine-to-machine/machine-type communications (M2M/MTC), internet of things (IoT), virtual reality (VR), augmented reality (AR), industrial control, self driving, remote medical, smart grid, smart furniture, smart office, smart wearables, smart transportation, smart city, uncrewed aerial vehicles, robots, and the like. The terminal device may be sometimes referred to as user equipment (UE), a terminal, an access station, a UE station, a remote station, a wireless communication device, a user apparatus, or the like. For ease of description, an example in which the terminal device is UE is used for description in embodiments of this application.

For example, a type of UE in embodiments of this application is a reduced capability UE (redcap UE). Compared with the existing common NR UE, the redcap UE usually supports only a lower bandwidth, for example, 20 MHz, and supports fewer transceiver antennas, for example, supports only 1T1R or 1T2R. According to research content of an existing subject, redcap UEs include three types of low-capability UEs: wearable products, video surveillance devices, and industrial sensor devices.

A network device in embodiments of this application includes, for example, an access network device and/or a core network device. The access network device is a device having a wireless transceiver function, and is configured to communicate with the terminal device. The access network device includes but is not limited to a base station (BTS, Node B, eNodeB/eNB, or gNodeB/gNB) in the foregoing communication system, a transmission reception point (TRP), a base station subsequently evolved from 3GPP, an access node in a Wi-Fi system, a wireless relay node, a wireless backhaul node, and the like. The base station may be a macro base station, a micro base station, a picocell base station, a small cell, a relay station, or the like. A plurality of base stations may support the foregoing networks using a same access technology, or may support the foregoing networks using different access technologies. The base station may include one or more co-site or non-co-site transmission reception points. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. For example, the network device in the V2X technology may be a road side unit (RSU). The following provides descriptions by using an example in which the access network device is a base station. A plurality of network devices in the communication system may be base stations of a same type, or may be base stations of different types. The base station may communicate with a terminal device, or may communicate with a terminal device via a relay station. The terminal device may communicate with a plurality of base stations in different access technologies. The core network device is configured to implement functions such as mobility management, data processing, session management, and policy and charging. Names of devices implementing core network functions in systems using different access technologies may be different. This is not limited in this application. A 5G system is used as an example. The core network device includes an access and mobility management function (AMF), a session management function (SMF), a user plane function (UPF), or the like.

In embodiments of this application, an apparatus configured to implement a function of the network device may be a network device, or may be an apparatus, for example, a chip system, that can support the network device in implementing the function. The apparatus may be installed in the network device. In the technical solutions provided in embodiments of this application, the technical solutions provided in embodiments of this application are described by using an example in which the apparatus configured to implement the function of the network device is the network device.

In embodiments of this application, unless otherwise specified, a quantity of terms represents "a singular term or a plural term", that is, "one or more". "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. For example, A/B indicates A or B. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, the first indication information and the second indication information may be same indication information, or may be different indication information. In addition, such names do not indicate different information amounts, content, priorities, sending sequences, importance degrees, or the like of the two pieces of indication information.

The foregoing describes some terms in embodiments of this application. The following describes technical features in embodiments of this application.

In the current NR standard, a function of barring UE from camping on a network is implemented by including two bits in a master information block (MIB). These two bits respectively represent cell barring (cellBarred) and internal frequency selection (intraFreqReselection), where cellBarred indicates whether the network allows UE to camp on, and intraFreqReselection indicates whether the network allows UE to reselect to an intra-frequency neighboring cell.

Currently, UE access control is implemented by using the UAC technology. UAC-related concepts include access class, access identity, and access category.

Each UE is allocated with a corresponding access class. Usually, an access class is written into a SIM card. In this case, if UE is installed with a SIM card, an access class of the UE can be determined. Currently, for a common user, an allocated access class is generally one of an access class 0 to an access class 9, and an access class 11 to an access class 15 are allocated to a high-priority user.

Currently, a correspondence (or a mapping relationship) between an access class and an access identity is defined in a standard, where the access class 0 to the access class 9 are all mapped to an access identity 0, and the access class 11 to the access class 15 are respectively mapped to an access identity 11 to an access identity 15. That is, in most cases, common UEs are mapped to the access identity 0. It can be learned that the access class or the access identity may be used to distinguish a type of the UE. Table 1 is a currently defined access identity and a corresponding UE configuration.

TABLE 1

| Access identity number | UE configuration |
| --- | --- |
| 0 | UE is not configured with any parameters from this table (UE is not configured with any parameters from this table) |
| 1 | UE is configured for multimedia priority service (UE is configured for multimedia priority service) |
| 2 | UE is configured for mission critical service (UE is configured for mission critical service) |
| 3 | UE for which disaster condition applies (UE for which disaster condition applies) |
| 3 to 10 | Reserved for future use |
| 11 | Access class 11 is configured in the UE |
| 12 | Access class 12 is configured in the UE |
| 13 | Access class 13 is configured in the UE |
| 14 | Access class 14 is configured in the UE |
| 15 | Access class 15 is configured in the UE |

An access category is further defined in the standard, and is used to distinguish an accessed service type. Therefore, the access category is related to a service of the UE. For example, when the UE initiates access due to an emergency call, the access category is an access category 2. Table 2 shows a currently defined access category and a corresponding service. An access category number is the first column in Table 2. For a service of the UE, refer to the third column in Table 2. It can be learned that different services may correspond to different access category numbers, that is, correspond to different access categories.

TABLE 2

| Access category number | Conditions related to UE | Type of access attempt |
| --- | --- | --- |
| 0 | All | MO signaling resulting from paging |
| 1 | UE is configured for delay tolerant service and subject to access control for access category 1, which is judged based on relation of UE's HPLMN and the selected PLMN (UE is configured for delay tolerant service and subject to access control for access category 1, which is judged based on relation of UE's HPLMN and the selected PLMN) | All except for emergency, or MO exception data |
| 2 | All | Emergency |
| 3 | All except for the conditions in access category 1 | MO signaling on NAS level resulting from other than paging |

TABLE 2-continued

| Access category number | Conditions related to UE | Type of access attempt |
| --- | --- | --- |
| 4 | All except for the conditions in access category 1 | Multimedia telephony (MMTEL) Voice |
| 5 | All except for the conditions in access category 1 | MMTEL video |
| 6 | All except for the conditions in access category 1 | Short message service (SMS) |
| 7 | All except for the conditions in access category 1 | MO data that belongs to any other access categories |
| 8 | All except for the conditions in access category 1 | MO signaling on radio resource control (RRC) level resulting from other than paging (MO signaling on RRC level resulting from other than paging) |
| 9 | All except for the conditions in access category 1 | MO IP multimedia subsystem registration related signaling |
| 10 | All | MO exception data |
| 11 to 31 | | Reserved standardized access categories |
| 32 to 63 | All | Classification based on operator (based on operator classification) |

A cell can broadcast access control parameters through a SIB1. The access control parameters are organized based on an access category and declare whether a corresponding access class is applicable. UE determines, based on the access control parameters, whether the UE is allowed to access the cell. The SIB1 is periodically broadcast, and a paging message notifies a change of a system message. If the paging message received by the UE indicates that the system message has changed, the UE needs to read the SIB1 again. Otherwise, the UE does not need to read the SIB1. The access control parameter corresponds to the access category. For example, the correspondence is specified in a protocol, or is preconfigured in the UE and the network device. In other words, both the UE and the network device can learn of the correspondence between the access control parameter and the access category. The access category may be determined based on a service, and the UE can determine, based on a service initiated by the UE for access, the access category corresponding to the UE. In addition, each set of access control parameters has an applicable access identity. Therefore, UE may determine an access control parameter applicable to the UE based on an access identity of the UE and an access category of the UE, so as to determine, based on the access control parameter, whether the UE is allowed to access the cell.

For example, if an access class of UE is 2, it can be learned from the foregoing description that an access identity of the UE is the access identity 0. In addition, for example, if the UE initiates random access due to an emergency, it can be learned from Table 2 that an access category of the UE is the access category 2. The access control parameter corresponds to the access category, and the UE may determine an access control parameter corresponding to the access category 2. The access control parameter may indicate whether the access control parameter is applicable to a corresponding access identity, so that the UE can determine whether the access control parameter is applicable to the access identity 0. If the access control parameter is applicable to the access identity 0, the UE uses the access control parameter to determine whether the UE is allowed to access the cell.

It can be learned from the foregoing description that, currently, for a common user, an allocated access class is one of the access class 0 to the access class 9. In most cases, for the common user, a corresponding access identity is the access identity 0. In this case, when access control is performed on common UE, a same set of access control parameters may be used for performing control. In this manner, different UEs cannot be distinguished, or access control cannot be separately performed on different UEs.

In view of this, the technical solutions in embodiments of this application are provided. In embodiments of this application, the access class allocated to the terminal device is one of the access class 0 to the access class 9. However, access identities corresponding to these access classes may be one or more of access identities 3 to 10 or H access identities. In other words, the access class 0 to the access class 9 may correspond to new access identities. Correspondingly, different access classes (or different access identities) are applicable to different access control parameters. Therefore, when access control is performed on these terminal devices, different access control parameters may be applied to different terminal devices for separate access control, to implement differentiated control at a finer granularity. For example, a terminal device required by a network or a terminal device that more needs to access a network can preferentially access the network, thereby meeting requirements of the terminal device and the network.

The technical solutions provided in embodiments of this application may be applied to a 4G system, for example, an LTE system, or may be applied to a 5G system, for example, an NR system, or may be further applied to a next-generation mobile communication system or another similar communication system. This is not specifically limited.

FIG. 1 shows an application scenario according to an embodiment of this application. FIG. 1 includes an access network device, a core network device, and UE. The UE may determine, by using an access control parameter, whether the UE is allowed to access a cell provided by the access network device.

The access network device works, for example, in an evolved universal mobile telecommunications system terrestrial radio access (evolved UMTS terrestrial radio access, E-UTRA) system, or in an NR system, or in a next-generation communication system or another communication system. The access network device is, for example, a base station. The access network device corresponds to different devices in different systems. For example, the access network device may correspond to an eNB in a 4G system, and corresponds to an access network device in 5G, for example, a gNB, in a 5G system. Certainly, the technical solutions provided in this embodiment of this application may also be applied to a future mobile communication system. Therefore, the access network device in FIG. 1 may also correspond to a network device in the future mobile communication system. In FIG. 1, an example in which the access network device is the base station is used. Actually, with reference to the foregoing descriptions, the access network device may alternatively be a device such as an RSU. In addition, an example in which the UE in FIG. 1 is a mobile phone is used. Actually, it can be learned from the foregoing description of the UE that the UE in this embodiment of this application is not limited to the mobile phone.

With reference to the accompanying drawings, the following describes the method provided in this embodiment of this application. In the accompanying drawings corresponding to embodiments of this application, all steps represented by dashed lines are optional steps.

Figure 2:
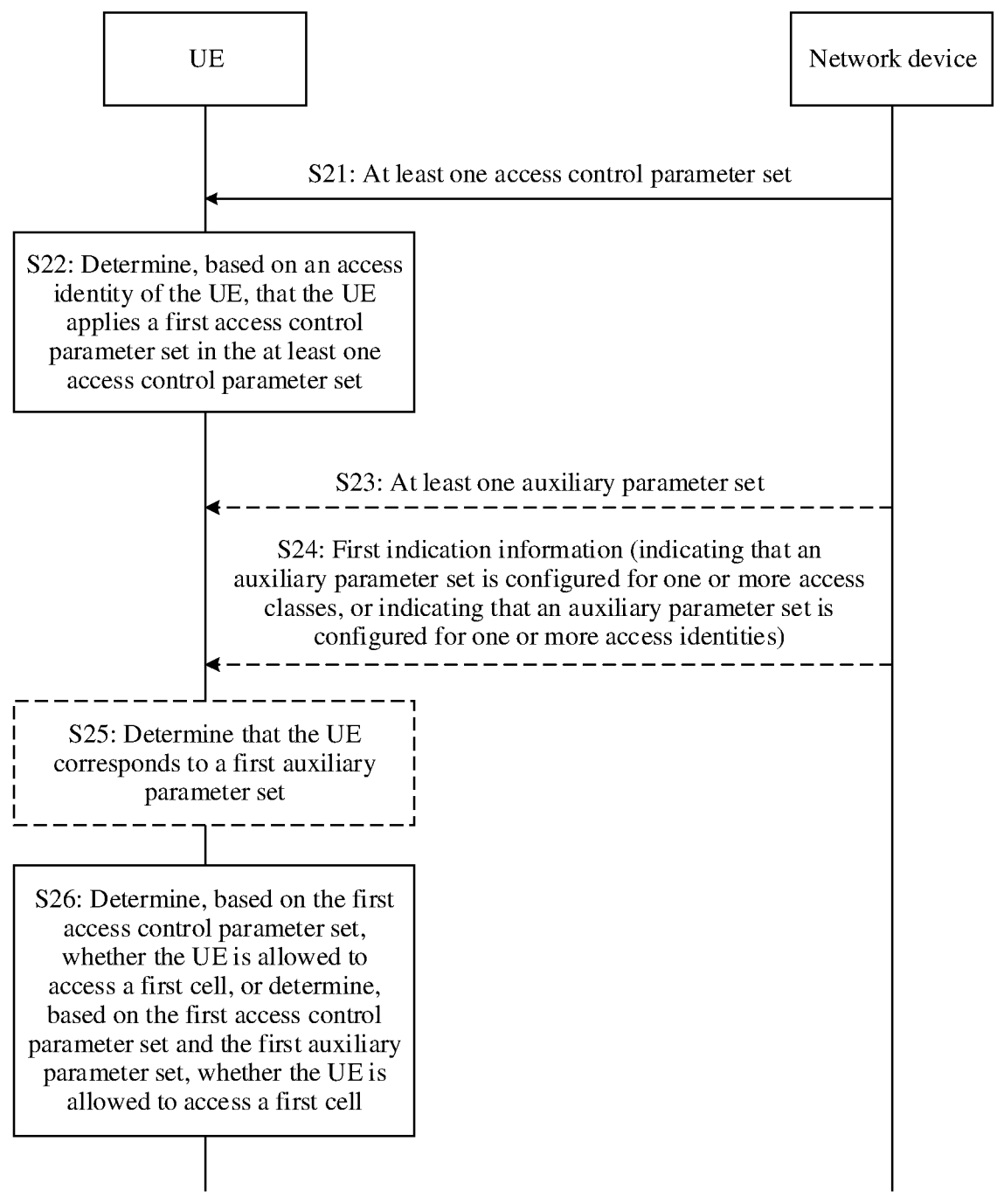
FIG. 2 is a flowchart of a first communication method according to an embodiment of this application.

An embodiment of this application provides a first communication method. FIG. 2 is a flowchart of the method. The following description process uses an example in which the method is applied to the network architecture shown in FIG. 1.

For ease of description, an example in which the method is performed by a network device and UE is used below. This embodiment of this application is applied to the network architecture shown in FIG. 1. Therefore, the network device described below is, for example, the access network device in the network architecture shown in FIG. 1, and the UE described below may be the UE in the network architecture shown in FIG. 1.

S21: The network device sends at least one access control parameter set, and correspondingly, the UE receives the at least one access control parameter set from the network device. For example, if the network device sends the at least one access control parameter set in a first cell, the UE may receive the at least one access control parameter set in the first cell. The first cell is a cell in which the UE is to initiate random access, or the UE expects to initiate random access in the first cell.

Before accessing the network device, the UE may receive the at least one access control parameter set. For example, the network device may send the at least one access control parameter set in the first cell by using a system message. The system message is, for example, a SIB1, or may be another system message. That is, the network device sends the at least one access control parameter set in one message. Certainly, the network device may also send the at least one access control parameter set in different messages. For example, each message sends one access control parameter set. In this case, the UE receives the system message in the first cell, to obtain the at least one access control parameter set. An access control parameter set corresponds to an access category. For example, each access control parameter set in the at least one access control parameter set corresponds to one access category. The UE may determine, based on a service initiated by the UE for access, an access category corresponding to the UE, so that the UE may determine an access control parameter set corresponding to the UE. In addition, an access control parameter set has an applicable access identity, and UE also has an access identity of the UE. In conclusion, UE can determine, based on an access category of the UE, an access control parameter set corresponding to the UE, and then determine, based on an access identity of the UE, whether the UE applies the access control parameter set. If the UE applies the access control parameter set, the UE may determine, based on the access control parameter set, whether the UE is allowed to access the network device, or determine whether the UE is allowed to access the first cell.

For example, the network device sends the at least one access control parameter set by using one message, and a format of the message is, for example:

```
UAC-BarringPerCatList ::= SEQUENCE(SIZE(1..maxAccessCat-1))
OF   UAC-BarringPerCat
  UAC-BarringPerCat ::=        SEQUENCE{
    accessCategory              INTEGER(1..maxAccessCat-1),
    uac-barringInfoSetIndex     UAC-BarringInfoSetIndex
  }
```

Herein, accessCategory indicates an access category number, and uac-barringInfoSetIndex indicates an index of an access control parameter set corresponding to the access category number indicated by accessCategory. The message may then include one or more access control parameter sets. For example, a format of an access control parameter set is as follows:

```
UAC-BarringInfoSet ::=        SEQUENCE{
    uac-BarringFactor    ENUMERATED{p00,p05,p10,p15,p20,p25,p30,
                   p40,p50,p60,p70,p75,p80,p85,p90,p95}
    uac-BarringTime    ENUMERATED{s4,s8,s16,s32,s64,s128,s256,s512}
    uac-BarringForAccessIdentity      BIT STRING(SIZE(7))
}
```

Herein, UAC-BarringInfoSet corresponds to an index, and the index is written after the UAC-BarringInfoSet. For example, the index is 1, 2, or the like. That is, the message may include at least one access control parameter set, and each access control parameter set corresponds to (or includes) one index. Therefore, the UE may determine the access category number of the UE based on a service of the UE with reference to Table 2; determine, based on the access category number, an index of an access control parameter set corresponding to the access category number; and then determine, based on the index of the access control parameter set, the access control parameter set corresponding to the UE from the at least one access control parameter set included in the message.

It can be learned that an access control parameter set may include several parameters: uac-BarringFactor, uac-BarringTime, and uac-BarringForAccessIdentity. The uac-BarringFactor may be referred to as a barring factor, and a value of the barring factor is a probability value, for example, 40% or 50%, or is represented as 0.4 or 0.5. For example, after determining the access control parameter set corresponding to the UE, the UE generates a random number (rand) before initiating access. If the random number is less than the value of the barring factor, the UE is allowed to access the cell. If the random number is greater than or equal to the value of the barring factor, the UE is barred from accessing the cell. A network can control a quantity of accessed UEs by setting the barring factor. For example, the network may set a small value of the barring factor, so that there is a low probability that the random number generated by the UE is less than the value, and the UE cannot easily access the cell. Therefore, the quantity of UEs accessing the cell is relatively small, so that network load is reduced. The uac-BarringTime may be referred to as access barring time, and a value of the uac-BarringTime is duration. If the UE determines, based on the barring factor, that the UE is barred from accessing the cell, the UE may start a timer T390. Duration of the timer T390 may be obtained based on the value of the access barring time. Within the duration, the UE is not allowed to access the cell (or is barred from accessing the cell). After the duration, the UE may generate a random number again, to re-determine, based on the barring factor, whether the UE is allowed to access the cell.

UE to which embodiments of this application are applicable is, for example, redcap UE. Both the redcap UE and legacy UE need to receive a SIB1. The legacy UE is UE with a common capability, or is not UE with a limited capability, or is UE other than the redcap UE. In an implementation of the SIB1, a SIB1 corresponding to the redcap UE is the same as a SIB1 corresponding to the legacy UE. In this case, the access control parameter set may not be changed, and the at least one access control parameter set is applicable to both the redcap UE and the legacy UE. In addition, an access control parameter set may further include a parameter. The parameter is uac-BarringForAccessIdentity, and uac-BarringForAccessIdentity may indicate an access identity to which the access control parameter set is applicable. UE can determine, based on the access identity of the UE, whether the access control parameter set is applicable. The uac-BarringForAccessIdentity included in the access control parameter set may indicate whether the access control parameter set is applicable to access identities 1, 2, 11, 12, 13, 14, and 15. The uac-BarringForAccessIdentity may be implemented in a form of a bitmap. For example, the uac-BarringForAccessIdentity includes 7 bits, and the 7 bits respectively correspond to access identities 1, 2, 11, 12, 13, 14, and 15. If a value of one of the 7 bits is "1", it indicates that the access control parameter set is applicable to the access identity corresponding to the bit. If a value of one of the 7 bits is "0", it indicates that the access control parameter set is not applicable to the access identity corresponding to the bit. It can be learned that the uac-BarringForAccessIdentity does not include a bit corresponding to the access identity 0. Therefore, for the UE of the access identity 0, if it is determined that the uac-BarringForAccessIdentity does not include the bit corresponding to the access identity 0, the UE may determine that the UE can apply the access control parameter set. It can be learned from this manner that the at least one access control parameter set is applicable to all UEs of the access identity 0.

However, in this embodiment of this application, an access class of a first category is allocated to the UE, and the access class of the first category corresponds to an access identity of a first category. The access class of the first category includes, for example, one or more of an access class 0 to an access class 9, or includes another access class, for example, 16, 17, 18, 19, 20, 21, 22, 23, 24 or 25. The access class of the first category refers to an access class other than an access class corresponding to a high-priority user, and the access class corresponding to the high-priority user includes, for example, 11 to 15. For example, it is considered that the access class 0 to the access class 9 are access classes of a first priority, an access class 11 to an access class 15 are access classes of a second priority, and the second priority is higher than the first priority. The access identity of the first category includes, for example, one or more of the following access identities: an access identity 3 to an access identity 10, or H access identities whose access identity numbers are greater than or equal to 16, where H is a positive integer. For example, the H access identities include an access identity 16, an access identity 17, and the like. The access class of the first category, the access identity of the first category, and the like are described below. If the access control parameter set is not changed, the uac-BarringForAccessIdentity still indicates whether the access control parameter set is applicable to access identities 1, 2, 11, 12, 13, 14, and 15. The uac-BarringForAccessIdentity may not indicate the access identity of the first category. In this case, for the UE in this embodiment of this application, if it is determined that uac-BarringForAccessIdentity of an access control parameter set does not include a bit corresponding to an access identity of the UE, the UE may determine that the UE can apply the access control parameter set. In the case, the at least one access control parameter set is applicable to all UEs of the access identity of the first category.

Alternatively, if the SIB1 corresponding to the redcap UE is the same as the SIB1 corresponding to the legacy UE, in this embodiment of this application, the access control parameter set may not be changed, or the access control parameter set may not be extended, but the SIB1 may be changed, or the SIB1 may be extended. For example, a same SIB1 may include two types of access control parameter sets, which are respectively referred to as a first-type access control parameter set and a second-type access control parameter set. The first-type access control parameter set is applicable to the legacy UE, and the first-type access control parameter set may include one or more access control parameter sets. In this case, the access control parameter set included in the first-type access control parameter set is the same as the access control parameter set described above. Details are not described again. In addition, in this embodiment of this application, the access class of the first category is allocated to the UE. The access class of the first category corresponds to the access identity of the first category. The access class of the first category, the access identity of the first category, and the like are described below. In this case, the second-type access control parameter set is applicable to UE to which the access class of the first category is allocated, and the at least one access control parameter set described in this embodiment of this application belongs to the second-type access control parameter set. Any access control parameter set included in the second-type access control parameter set may include indication information. The indication information is referred to as, for example, fifth indication information. The fifth indication information may indicate whether the access control parameter set is applicable to the access identity of the first category. For example, the fifth indication information may be implemented by using a bitmap. In this case, the bitmap may include N bits, where N is a positive integer, the N bits correspond to the access identity of the first category, a quantity of N is equal to a quantity of access identities of the first category, and the N bits are in a one-to-one correspondence with the access identity of the first category. For an access identity in the access identity of the first category, if a value of a bit corresponding to the access identity in the N bits included in an access control parameter set of the second-type access control parameter set is "1", it indicates that the access control parameter set is applicable to the access identity; or if a value of a bit corresponding to the access identity in the N bits is "0", it indicates that the access control parameter set is not applicable to the access identity.

Alternatively, even if the SIB1 corresponding to the redcap UE is the same as the SIB1 corresponding to the legacy UE, in this embodiment of this application, the access control parameter set may be changed, or the access control parameter set may be extended. For example, a quantity of bits included in the uac-BarringForAccessIdentity is extended. Originally, the uac-Barring ForAccessIdentity includes 7 bits. In this embodiment of this application, the uac-BarringForAccessIdentity includes 7+N bits, where N is a positive integer, and the N bits correspond to the access identities of the first category. A quantity of the access identities of the first category may be equal to N, the N bits are in a one-to-one correspondence with the access identities of the first category, and one of the N bits indicates one access identity in the access identities of the first category. For any access identity in the access identity of the first category, if a value of a bit corresponding to the access identity in the N bits is "1", it indicates that the access control parameter set is applicable to the access identity; or if a value of a bit corresponding to the access identity in the N bits is "0", it indicates that the access control parameter set is not applicable to the access identity.

Alternatively, in another implementation of the SIB1, the redcap UE and the legacy UE correspond to different SIB1s. In other words, the network device separately sends different SIB1s to the redcap UE and the legacy UE. In this case, the redcap UE may fail to identify the SIB1 corresponding to the legacy UE, and the legacy UE may also fail to identify the SIB1 corresponding to the redcap UE. That is, UE can identify only a SIB1 corresponding to the UE, and the UE only needs to process the SIB1 that can be identified by the UE. If the SIB1 corresponding to the redcap UE is different from the SIB1 corresponding to the legacy UE, the access control parameter set may continue to be not changed in this embodiment of this application, or optionally, the access control parameter set may be changed (or extended) in this case in this embodiment of this application. There are a plurality of modification manners, which are described below by using examples.

1. A First Modification Manner of the Access Control Parameter Set.

For example, an access control parameter set may include second indication information. An access identity or access identities to which the access control parameter set is applicable may be indicated by using the second indication information. UE can determine, based on an access identity of the UE and the second indication information, whether the UE applies the access control parameter set. For example, the second indication information is represented as uac-BarringForAccessIdentitybitmap, or may be represented in another form. It may be understood that in this manner, uac-BarringForAccessIdentity originally included in the access control parameter set is extended, to obtain the second indication information. Alternatively, in this manner, uac-BarringForAccessIdentity originally included in the access control parameter set is removed, and the second indication information is added to the access control parameter set.

The second indication information may indicate whether the access control parameter set is applicable to the access identity of the first category. Optionally, the second indication information may further indicate whether an access control parameter set is applicable to another access identity. The another access identity is another access identity other than the access identity of the first category, for example, access identities 11 to 15 (that is, an access identity corresponding to the high-priority user). For example, the second indication information may also be implemented in a form of a bitmap. A quantity of bits included in the bitmap may be equal to a quantity of to-be-indicated access identities. For example, if to-be-indicated access identities of the first category include the access identity 3 to the access identity 10, the bitmap includes 8 bits. For example, if a value of one of the 8 bits is "1", it indicates that the access control parameter set is applicable to the access identity corresponding to the bit. If a value of one of the 8 bits is "0", it indicates that the access control parameter set is not applicable to the access identity corresponding to the bit. For example, if the bitmap included in an access control parameter set is "00100110", it indicates that the access control parameter set is applicable to the access identity 5, the access identity 8, and the access identity 9, but is not applicable to the access identity 3, the access identity 4, the access identity 6, the access identity 7, and the access identity 10.

Alternatively, the second indication information may be implemented in another manner. For example, the second indication information may include an access identity number, an access identity corresponding to the access identity number included in the second indication information is applicable to the access control parameter set, and an access identity corresponding to an access identity number not included in the second indication information is not applicable to the access control parameter set. For example, second indication information of an access control parameter set includes an access identity number 3 and an access identity number 5, but does not include another access identity number. The access identity number 3 corresponds to the access identity 3, and the access identity number 5 corresponds to the access identity 5. In this case, it indicates that the access control parameter set is applicable to the access identity 3 and the access identity 5, but is not applicable to the another access identity.

In the first modification manner of the access control parameter set, in addition to the second indication information, an access control parameter set may further include two parameters: a barring factor and access barring time. For descriptions of the two parameters, refer to the foregoing descriptions. In the first modification manner of the access control parameter set, the two parameters are not modified.

In this modification manner, only uac-BarringForAccessIdentity included in the access control parameter set is changed, and the access control parameter set is slightly modified, which is easy to implement.

2. A Second Modification Manner of the Access Control Parameter Set.

In this modification manner, one access control parameter set may include a plurality of access control parameter subsets, and each access control parameter subset may have a corresponding access identity. It may be understood that, in this manner, a quantity of access control parameter sets actually increases. For example, an access control parameter set may include a first access control parameter subset and a second access control parameter subset, and include third indication information corresponding to the first access control parameter subset and fourth indication information corresponding to the second access control parameter subset. The third indication information indicates an access identity to which the first access control parameter subset is applicable, and UE can determine, based on an access identity of the UE and the third indication information, whether the UE applies the first access control parameter subset. The fourth indication information indicates an access identity to which the second access control parameter subset is applicable, and UE can determine, based on an access identity of the UE and the fourth indication information, whether the UE applies the second access control parameter subset.

Alternatively, in this modification manner, the access control parameter set may be referred to as a set, and the access control parameter subset may be referred to as an access control parameter set. For example, the network device sends at least one set, and one of the at least one set may include one or more access control parameter sets. For example, the at least one set includes a first set, and the first set includes a first access control parameter set and a second access control parameter set, and includes third indication information corresponding to the first access control parameter set and fourth indication information corresponding to the second access control parameter set. The third indication information indicates an access identity to which the first access control parameter set is applicable, and UE can determine, based on an access identity of the UE and the third indication information, whether the UE applies the first access control parameter set. The fourth indication information indicates an access identity to which the second access control parameter set is applicable.

For example, the third indication information or the fourth indication information is represented as uac-BarringForAccessIdentitybitmap, or may be represented in another form.

The third indication information may indicate whether the first access control parameter set is applicable to M access identities. The M access identities belong to the access identities of the first category. For example, M is a positive integer, and M is less than or equal to a quantity of access identities of the first category. For example, the third indication information may also be implemented in a form of a bitmap. A quantity of bits included in the bitmap may be equal to a quantity of to-be-indicated access identities. For example, if indicated access identities of the first category include the access identity 3 to the access identity 10, the bitmap includes 8 bits. For example, if a value of one of the 8 bits is "1", it indicates that the first access control parameter set is applicable to the access identity corresponding to the bit. If a value of one of the 8 bits is "0", it indicates that the first access control parameter set is not applicable to the access identity corresponding to the bit.

Alternatively, the third indication information may be implemented in another manner. For example, the third indication information may include an access identity number, an access identity corresponding to the access identity number included in the third indication information is applicable to the first access control parameter set, and an access identity corresponding to an access identity number not included in the third indication information is not applicable to the first access control parameter set. For an example of this, refer to the foregoing example in which the second indication information includes the access identity number.

An implementation of the fourth indication information is also similar to that of the third indication information. Details are not described again.

For example, a configuration manner of the first set is as follows:

```
UAC-BarringInfoSet :: =    SEQUENCE{
    uac-BarringFactor
    ENUMERATED{p00,p05,p10,p15,p20,p25,p30,p40,
            p50,p60,p70,p75,p80,p85,p90,p95},
        uac-BarringTime             ENUMERATED{s4,s8,s16,s32,s128,
S256,s512},
        uac-BarringForAccessIdentity   BIT STRING(SIZE(8))
        uac-BarringFactor      ENUMERATED{p00,p05,p10,p15, p20,p25,p30,p40,
            p50,p60,p70,p75,p80,p85,p90,p95},
        uac-BarringTime        ENUMERATED{s4,s8,s16,s32,s128, s256,s512},
        uac-BarringForAccessIdentity   BIT STRING(SIZE(8))
```

It can be learned that the first set includes two sets of parameters, each set of parameters includes uac-BarringFactor, uac-BarringTime, and uac-Barring ForAccessIdentity, and each set of parameters represents an access control parameter set.

For example, both the third indication information and the fourth indication information indicate an applicable case to the access identity 3 to the access identity 10. For example, if the third indication information included in the first access control parameter set is "11000000", and the fourth indication information included in the second access control parameter subset is "00100000", it indicates that the first access control parameter set is applicable to the access identity 3 and the access identity 4, but not applicable to the access identity 5, the access identity 6, the access identity 7, the access identity 8, the access identity 9, and the access identity 10, and the second access control parameter set is applicable to the access identity 5, but not applicable to the access identity 3, the access identity 4, the access identity 5, the access identity 6, the access identity 7, the access identity 8, the access identity 9, and the access identity 10.

In this case, one set may include one or more access control parameter sets. In addition to indication information (for example, the third indication information or the fourth indication information), one access control parameter set may further include two parameters: a barring factor and access barring time. For descriptions of the two parameters, refer to the foregoing descriptions. Different access control parameter sets may include the two parameters, and values of the two parameters included in the different access control parameter sets may be the same or may be different.

This modification manner is equivalent to extending content of an access control parameter set. Although one access control parameter set (or one set) corresponds to one access category, access control parameter sets applicable to different access identities may also be provided for one access category, which is more conducive to implementing refined access control.

As briefly described above, in this embodiment of this application, the access class of the first category may be allocated to the UE. For example, different access classes may be allocated to different types of UEs. An access class allocated to the UE may be the access class of the first category, or an access class of a common user. For example, the access class of the first category includes one or more of the access class 0 to the access class 9. For example, the access class of the first category includes all access classes in the access class 0 to the access class 9. Alternatively, in the 10 access classes from the access class 0 to the access class 9, only some access classes may be currently used, and some remaining access classes are not used. In this case, the access class of the first category in this embodiment of this application may include unused access classes from the access class 0 to the access class 9. For example, currently, the access class 0 to the access class 5 are used, but the access class 6 to the access class 9 are not used. In this case, the access class of the first category in this embodiment of this application may include the access class 6 to the access class 9. In other words, when an access class is allocated to UE in this embodiment of this application, one of the access class 6 to the access class 9 may be allocated. Alternatively, the access class of the first category may further include another access class other than the access class 0 to the access class 9. Alternatively, the access class of the first category may not include the access class 0 to the access class 9, but include another access class. For example, one or more access classes whose numbers are greater than or equal to 16 are newly defined as the access class of the first category. In this embodiment of this application, an example in which the access class of the first category includes the access class 0 to the access class 9 is used.

In this embodiment of this application, the access class may also be written into a subscriber identity module (SIM) card. The access class of the UE in this embodiment of this application is different from an existing access class of the UE, or in other words, a correspondence between an access class and an access identity in this embodiment of this application is different from an existing correspondence. Currently, the access class of the UE is also written into the SIM card. Therefore, if the access class in this embodiment of this application is written into the SIM card, the access class needs to be distinguished from the access class that has been written into the existing SIM card. For example, in this embodiment of this application, a new file, for example, referred to as a first file or an extended file, may be added to the SIM, and the access class allocated in this embodiment of this application is written into the first file. If an access class described in this embodiment of this application is allocated to UE, an access class of the UE is written into the first file of the SIM card set in the UE. If an original access class is allocated to the UE, the access class of the UE is written into the original file (or referred to as a legacy file) of the SIM card set in the UE. For UE, if it is determined that an access class of the UE is written into the first file in the SIM card, the UE may determine to use the new correspondence (that is, the correspondence between the access class and the access identity) provided in this embodiment of this application to determine the access identity of the UE. If the UE determines that the access class of the UE is written into the original file in the SIM card, the UE may determine to use the original correspondence (that is, the correspondence between the access class and the access identity), to determine the access identity of the UE.

Alternatively, in another manner, the UE may be enabled to determine whether the UE corresponds to the new access class provided in this embodiment of this application or the original access class. For example, if the new access class provided in this embodiment of this application is allocated to the UE, the access class of the UE may still be written into the original file of the SIM card, and indication information may be added to the access class, for example, referred to as first information. The first information indicates that the access class is a newly defined access class. However, if the original access class is allocated to the UE, the UE does not correspond to the first information. If the UE determines that the access class of the UE corresponds to the first information, the UE may determine to use the new correspondence provided in this embodiment of this application to determine the access identity of the UE. If the UE determines that the access class of the UE does not correspond to the first information, the UE may determine to use the original correspondence to determine the access identity of the UE.

The UE to which this embodiment of this application is applicable, or the UE to which the access class of the first category is allocated is, for example, redcap UE. If the UE is legacy UE, the access class of the first category may not be allocated. In this case, the original access class may be allocated to the legacy UE, and the access class of the first category provided in this embodiment of this application does not need to be allocated. From this perspective, it may be considered that the access class of the first category is allocated to the redcap UE. In this embodiment of this application, the redcap UE may be further classified into a plurality of different types, so that different access classes may be allocated to these different types of UEs. Alternatively, in this embodiment of this application, the UE to which the access class of the first category is allocated may further include another UE, for example, may further include another UE with a limited capability other than the redcap UE, or may further include common UE, or referred to as the legacy UE, that is, UE whose capability is not limited.

When the UEs are classified into different types, the classification may be performed based on different factors. For example, the division factor may include one or more of the following: a bandwidth supported by the UE, a quantity of antennas supported by the UE, an application scenario of the UE, a maximum data transmission rate (max data rate) supported by the UE, or a maximum transport block size (max transport block size) supported by the UE. For example, the UE is classified into different types based on a bandwidth supported by the UE; or the UE is classified into different types based on a quantity of antennas supported by the UE; or the UE is classified into different types based on an application scenario of the UE; or the UE is classified into different types based on a maximum data transmission rate supported by the UE; or the UE is classified into different types based on a maximum transport block size supported by the UE; or the UE is classified into different types based on a bandwidth supported by the UE and a quantity of antennas supported by the UE; or the UE is classified into different types based on an application scenario of the UE, a maximum data transmission rate supported by the UE, and a maximum transport block size supported by the UE, and the like. If the quantity of antennas supported by the UE is, for example, 1T1R or 1T2R, the UE supporting 1T1R may be classified as one type of UE, and the UE supporting 1T2R is classified as another type of UE. The application scenario of the UE may also be understood as an implementation form of the UE. For example, if the UE is a wristband, it is considered as an application scenario; or if the UE is a sensor, it is considered as another application scenario; or if the UE is a camera, it is considered as still another application scenario.

The access class of the first category described in this embodiment of this application may be considered different from the existing access class 0 to access class 9, because the access class of the first category in this embodiment of this application corresponds to the access identity of the first category. Specifically, a correspondence between a specific access class and a specific access identity is not limited in this embodiment of this application. For example, in this embodiment of this application, the access class 0 and the access class 1 correspond to the access identity 3, the access class 2 corresponds to the access identity 4, the access class 3 corresponds to the access identity 5, the access class 4 corresponds to the access identity 6, the access class 5 corresponds to the access identity 7, the access class 6 corresponds to the access identity 8, the access class 7 and the access class 8 correspond to the access identity 9, and the access class 9 corresponds to the access identity 10. However, this is merely an example, and a specific correspondence is not limited thereto.

For example, UEs are classified into different types based on bandwidths supported by the UEs. For example, UE of a first type is redcap UE that supports a bandwidth of 5 M or 10 M, and UE of a second type is redcap UE that supports a bandwidth of 20 M. The access class 1 is allocated to redcap UEs of the first type, and the access class 2 is allocated to redcap UEs of the second type. For example, the access class 1 corresponds to the access identity 3, and the access class 2 corresponds to the access identity 4.

The access class of the first category in this embodiment of this application corresponds to the access identity of the first category, and the access identity of the first category is applicable to respective access control parameter, so that different UEs are applicable to different access control parameters. When access control is performed on these terminal devices, different access control parameters may be used, to separately perform access control on different terminal devices. For example, a terminal device required by a network or a terminal device that more needs to access a network can preferentially access a network, to meet requirements of the terminal device and the network.

S22: The UE determines, based on the access identity of the UE, that the UE applies the first access control parameter set in the at least one access control parameter set. The first access control parameter set may belong to the first set, or may not belong to any set, but is as a whole.

The UE determines, based on the access identity of the UE, that the UE applies the first access control parameter set in the at least one access control parameter set. In an implementation, the UE determines, based on the access identity and the access category of the UE, that the UE applies the first access control parameter set in the at least one access control parameter set.

For example, the UE may determine, based on the access category of the UE, that the UE corresponds to the first access control parameter set in the at least one access control parameter set, and then determine, based on the access identity of the UE, whether the UE applies the first access control parameter set.

The UE may determine, in Table 2 based on a service initiated by the UE for access, an access category number corresponding to the UE, that is, determine the access category of the UE. An access control parameter set corresponds to an access category. For example, one access control parameter set in the at least one access control parameter set corresponds to one access category, and the correspondence is known to the UE. Therefore, the UE may determine the access control parameter set corresponding to the access category of the UE, for example, the first access control parameter set.

In this embodiment of this application, the access class of the UE belongs to the access class of the first category, the access class of the first category corresponds to the access identity of the first category, and the UE can determine the access identity of the UE based on the access class of the UE. The UE may determine the access class of the UE by reading SIM card information each time the UE is powered on, and determine the access identity of the UE based on the access class of the UE. However, in a running process after being powered on, the UE does not need to perform an operation of determining the access identity of the UE based on the access class of the UE. An access control parameter set may indicate, by using corresponding indication information (for example, second indication information, third indication information, or fourth indication information), an access identity to which the access control parameter set is applicable, so that the UE can determine, based on the access identity of the UE, whether the UE applies the first access control parameter set.

Alternatively, the UE may determine, from the at least one access control parameter set based on the access identity of the UE, P access control parameter sets applicable to the UE, and then determine, from the P access control parameter sets based on the access category of the UE, the first access control parameter set corresponding to the UE, where P is a positive integer.

Alternatively, the UE may determine, based on the access identity of the UE, that the UE applies the first access control parameter set in the at least one access control parameter set without using the access category. For example, the UE determines, from the at least one access control parameter set based on the access identity of the UE, P access control parameter sets applicable to the UE, so that the P access control parameter sets are the first access control parameter set. In this case, the first access control parameter set includes the P access control parameter sets.

In conclusion, how the UE determines the first access control parameter set is not limited in this embodiment of this application.

S23: The network device sends at least one auxiliary parameter set, and correspondingly, the UE receives the at least one auxiliary parameter set from the network device. For example, if the network device sends at least one auxiliary parameter set in the first cell, the UE receives the at least one auxiliary parameter set in the first cell.

The network device may send the at least one auxiliary parameter set by using a system message. For example, the system message is a SIB1. If the SIB1 corresponding to this embodiment of this application and the existing SIB1 are a same SIB1, it is considered that the network device sends both the at least one auxiliary parameter set and the at least one access control parameter set (or at least one set) in the SIB1. Alternatively, the at least one auxiliary parameter set may be separately sent by using another message. The message is, for example, a system message or another broadcast message, or may be a unicast message.

In this embodiment of this application, to better separately perform access control on UEs of different types, auxiliary parameter sets may be further configured for the UEs of different types, to further separately perform access control on the UEs of different types by using the auxiliary parameter sets. For example, in this embodiment of this application, an auxiliary parameter set is separately configured for one or more access classes, or an auxiliary parameter set is separately configured for one or more access identities. For example, an auxiliary parameter set is configured for each access class in one or more access classes, that is, an access class and an auxiliary parameter set may be in a one-to-one correspondence; or one auxiliary parameter set is uniformly configured for one or more access classes, that is, only one auxiliary parameter set is configured regardless of a quantity of the one or more access classes. For another example, an auxiliary parameter set is configured for each access identity in one or more access classes, that is, the access identity and the auxiliary parameter set may be in a one-to-one correspondence; or one auxiliary parameter set is uniformly configured for one or more access identities, that is, only one auxiliary parameter set is configured regardless of a quantity of the one or more access identities.

One auxiliary parameter set in the at least one auxiliary parameter set may include one or more of the following parameters: a probability factor, a time factor, random access resource information, or a first threshold. For example, an auxiliary parameter set may include a probability factor; or an auxiliary parameter set may include a time factor; or an auxiliary parameter set may include random access resource information; or an auxiliary parameter set may include a probability factor and a time factor; or an auxiliary parameter set may include a probability factor, a time factor, and random access resource information; or an auxiliary parameter set may include a probability factor, a time factor, random access resource information, a first threshold, and the like. The random access resource information may also be referred to as dedicated random access resource information, indicating that the random access resource information is dedicated to use by the UE applicable to the auxiliary parameter set, and cannot be used by another UE. The auxiliary parameter set is, for example, any auxiliary parameter set in the at least one auxiliary parameter set.

For example, the probability factor is represented as a UAC bar scale factor, or is represented as uac-BarringFactor-new, or may be represented in another form. The probability factor may be used to adjust a barring factor included in the access control parameter set. A value of the probability factor may be greater than 0. In addition, the value of the probability factor may be less than 1, or may be greater than 1. For example, if an access class or an access identity of UE is configured with an auxiliary parameter set, the UE may use the auxiliary parameter set. If the auxiliary parameter set includes a probability factor, a manner in which the UE uses the probability factor is to obtain a value based on the probability factor and a barring factor included in an access control parameter set corresponding to the UE. For example, the value is referred to as an access barring probability, and the access barring probability is used by the UE to determine whether the UE is allowed to access a current cell. A manner in which the UE obtains the access barring probability based on the probability factor and the barring factor is: multiplying the probability factor by the barring factor to obtain the access barring probability. For example, if the probability factor is represented as X, and the access barring probability is represented as uac-BarringFactor-new, uac-BarringFactor-new=uac-BarringFactor×X. For example, if the barring factor included in the access control parameter set corresponding to the UE is 0.3, and the value of the probability factor included in the auxiliary parameter set corresponding to the access class or the access identity of the UE is 0.5, the UE may determine that the access barring probability is 0.15, so that the UE may determine, based on 0.15, whether the UE is allowed to access the current cell. For example, the UE may generate a random number, and compare the random number with 0.15. If the random number is less than 0.15, the UE is allowed to access the current cell, and if the random number is greater than or equal to 0.15, the UE is barred from accessing the current cell. If a value of a probability factor included in an auxiliary parameter set is set to 0, it indicates that UE of an access class or an access identity corresponding to the auxiliary parameter set is barred from accessing.

Alternatively, a manner in which the UE obtains the access barring probability based on the probability factor and the barring factor is: adding the probability factor to the barring factor or subtracting the probability factor from the barring factor to obtain the access barring probability. For example, uac-BarringFactor-new=uac-BarringFactor+X, or uac-BarringFactor-new=|uac-BarringFactor−X|, where an absolute value symbol is added in consideration of a case in which a negative number may occur after subtraction. After obtaining the access barring probability, the UE uses the access barring probability in a manner similar to that described above. Details are not described again.

Alternatively, the UE may obtain the access barring probability based on the probability factor and the barring factor in another manner. This is not limited.

For example, the time factor may be represented as a UAC bar time factor, or represented as uac-BarringTime-new, or may be represented in another form. A value of the time factor may be greater than 0. In addition, the value of the time factor may be less than 1, or may be greater than 1. For example, if an access class or an access identity of UE is configured with an auxiliary parameter set, the UE may use the auxiliary parameter set. If the auxiliary parameter set includes a time factor, a manner in which the UE uses the time factor is to obtain a value based on the time factor and access barring time included in an access control parameter set corresponding to the UE. The value is referred to as, for example, barring time. The barring time is used to bar the UE from accessing the current cell, or in other words, bar the UE from accessing the current cell within the barring time. A manner in which the UE obtains the barring time based on the time factor and the access barring time is: multiplying the time factor by a value of the access barring time to obtain the barring time. For example, if the time factor is represented as Y, and the barring time is represented as uac-BarringTime-new, (uac-BarringTime-new)=(uac-BarringTime)×Y. Content in parentheses represents a parameter, and "-" belongs to a representation form of the parameter, but does not represent a minus sign. This is similar in the following. For example, if the value of the access barring time included in the access control parameter set corresponding to the UE is 30 seconds(s), and the value of the time factor included in the auxiliary parameter set corresponding to the access class or the access identity of the UE is 2, the UE may determine that the barring time is 60s. For example, if the UE determines, based on the access barring probability, that the UE is barred from accessing the current cell, the UE may start a timer T390, and the UE generates a random number. In this case, timing duration of the timer T390 may be obtained based on the barring time and the random number. For example, timing duration of the timer T390=(0.7+0.6×rand)×barring time, where rand represents the random number. Before the timer T390 expires, the UE is barred from accessing the cell. When or after the timer T390 expires, the UE may generate a random number again, to re-determine, based on the access barring probability, whether the UE is allowed to access the cell.

Alternatively, a manner in which the UE obtains the barring time based on the time factor and the access barring time is: adding the time factor to the access barring time or subtracting the time factor from the access barring time to obtain the barring time. For example, (uac-BarringTime-new)=(uac-BarringTime)+Y, or (uac-BarringTime-new)=|(uac-BarringTime)−Y|, where an absolute value symbol is added in consideration of a case in which a negative number may occur after subtraction. After obtaining the barring time, the UE uses the barring time in a manner similar to that described above. Details are not described again.

Alternatively, the UE may obtain the barring time based on the time factor and the access barring time in another manner. This is not limited.

If an auxiliary parameter set is configured for an access identity or an access class of UE, random access resource information included in the auxiliary parameter set may be used by the UE to perform random access to the current cell. For example, the random access resource information may indicate a random access channel (RACH) occasion, or indicate a random access preamble index set, or indicate a RACH occasion and a preamble index set, or may indicate another random access resource. For example, the network device configures random access resource information for an auxiliary parameter set. If the network device receives a random access request (for example, a random access preamble) from the UE on the random access resource information, the network device may determine that the UE is UE applicable to the auxiliary parameter set. In this manner, the network device can determine an identity of the UE by using a first message (Msg1) in a random access process. If no additional random access resource is allocated to the UE, the network device may determine the identity of the UE by using a fifth message (Msg5) in the random access process.

Therefore, for the network device, different types of UEs may be distinguished based on different random access resource information. For example, the network device may schedule different resources for different types of UEs in a subsequent random access process, or after random access succeeds, the network device may schedule different resources for different types of UEs, to further implement differentiated control on different types of UEs.

The first threshold is a threshold of the first parameter, and the first parameter may indicate signal quality of the UE. For example, the first parameter is reference signal receiving power (RSRP), reference signal receiving quality (RSRQ), or a signal to interference plus noise ratio (SINR). By setting the first threshold, the UE may determine whether to use the auxiliary parameter set corresponding to the access identity or the access class of the UE. For example, an auxiliary parameter set is configured for an access identity or an access class of UE, and the auxiliary parameter set includes a first threshold. The UE may determine a value of the first parameter through measurement. If the value of the first parameter measured by the UE is less than the first threshold, the UE may use the auxiliary parameter set. For a use manner, refer to the foregoing descriptions. If the value of the first parameter obtained by the UE through measurement is greater than or equal to the first threshold, the UE may not use the auxiliary parameter set. For example, the UE uses the access control parameter set corresponding to the UE to determine whether the UE is allowed to access the current cell. If the UE is allowed to access the current cell, the UE does not need to use the random access resource indicated by the random access resource information included in the auxiliary parameter set, but may use another random access resource. For UE with poor signal quality, if a large quantity of UEs access a network, because signal quality of these UEs is poor, the network needs to allocate a large quantity of resources to these UEs, to enable these UEs to implement communication. For UE with good signal quality, the network device may allocate a small quantity of resources to enable the UE to reach a high transmission rate. For UE with poor signal quality, the network device needs to allocate a large quantity of resources to enable the UE to reach a specific transmission rate. As a result, resource overheads of the network device are high, and efficiency of the network device is reduced. Therefore, in this embodiment of this application, the first threshold is set, so that the auxiliary parameter set can be used by users with poor signal quality. For example, access of these users is restricted by using the auxiliary parameter set (for example, a probability factor is set to a small value, signal quality of a set random access resource is poor, or a quantity of random access resources is small). Because it is difficult for the users with poor signal quality to access the network device, the network device does not need to allocate a resource to the users with poor signal quality, so that resources of the network device can be provided for users with good signal quality, and efficiency of the network device is improved. It can be learned that, in this manner, access control can be separately performed on UEs of different types, and access control can also be separately performed on UEs of different signal quality.

Alternatively, the at least one auxiliary parameter set may be predefined, or specified in a protocol, and therefore does not need to be sent by the network device. Alternatively, the auxiliary parameter set may not be configured. Therefore, S23 is an optional step, and is not mandatory.

S24: The network device sends first indication information, and correspondingly, the UE receives the first indication information from the network device. The at least one auxiliary parameter set sent by the network device in S23 may include all auxiliary parameter sets indicated by the first indication information.

The network device may send the first indication information by using a system message. For example, the system message is a SIB1. If a SIB1 corresponding to this embodiment of this application and an existing SIB1 are a same SIB1, it is considered that the network device sends the first indication information and the at least one access control parameter set (or the at least one set) in the SIB1, and the at least one auxiliary parameter set may be sent in another message. Alternatively, if the at least one auxiliary parameter set is also sent by using the SIB1, the network device sends the first indication information, the at least one auxiliary parameter set, and the at least one access control parameter set in the SIB1. Alternatively, the network device may send the first indication information and the at least one auxiliary parameter set in one message, where the message is, for example, another system message other than the SIB1, or another broadcast message, or a unicast message, and send the at least one access control parameter set in another message. Alternatively, the first indication information may be separately sent by using another message other than the SIB1. The message is, for example, a system message or another broadcast message, or may be a unicast message.

The network device needs to notify the UE of an access class or access classes for which the auxiliary parameter set is configured by the network device, or an access identity or access identities for which the auxiliary parameter set is configured by the network device. In this case, the network device may send the first indication information. The first indication information may indicate that an auxiliary parameter set is configured for one or more access classes. After receiving the first indication information, the UE can determine the access class or the access classes for which the auxiliary parameter set is configured, so that the UE can determine, based on the access class of the UE, whether an auxiliary parameter set is configured for the access class. Alternatively, the first indication information may indicate that the auxiliary parameter set is configured for one or more access identities. After receiving the first indication information, the UE can determine the access identity or the access identities for which the auxiliary parameter set is configured, so that the UE can determine, based on the access identity of the UE, whether the auxiliary parameter set is configured for the access identity.

For example, the first indication information may be implemented by using a bitmap. If the first indication information indicates that an auxiliary parameter set is configured for one or more access classes, a quantity of bits included in the bitmap may be equal to a total quantity of access classes that need to be indicated. For example, the first indication information in this case may be represented as uac-accessclassbitmap. For example, the new access class in this embodiment of this application includes an access class 0 to an access class 9, and there are a total of 10 access classes. In this case, the bitmap may include 10 bits, and the 10 bits are in a one-to-one correspondence with the 10 access classes. For example, if a value of a bit in the bitmap is "1", it indicates that an auxiliary parameter set is configured for an access class corresponding to the bit; or if a value of a bit in the bitmap is "0", it indicates that no auxiliary parameter set is configured for an access class corresponding to the bit. For example, if the bitmap is "0101000000", it indicates that the network separately configures an auxiliary parameter set for the access class 1 and the access class 3, but does not configure an auxiliary parameter set for another access class. For example, the network device sends the first indication information and the at least one auxiliary parameter set in one message. The message is referred to as a first message. The first message is, for example, a SIB1, or may be another message. In this case, the SIB1 may include a bitmap and an auxiliary parameter set indicated by the bitmap. For example, if the bitmap included in the SIB is "0101000000", the SIB1 further includes an auxiliary parameter set corresponding to the access class 1 and an auxiliary parameter set corresponding to the access class 3.

For example, the network device separately configures an auxiliary parameter set for the access class 1 and the access class 3. For example, an auxiliary parameter set 1 is configured for the access class 1, and an auxiliary parameter set 2 is configured for the access class 2. The two auxiliary parameter sets are, for example, sent in one message. For example, a manner in which the message is configured with the two auxiliary parameter sets is as follows:

Uac-auxiliary parameter set 1 (corresponding to access class 1): {UAC
    Bar Scale Factor X1;
    UAC Bar Time Factor Y1;
    RACH resource set: {
    Dedicated RACH occasion;
    Dedicated preamble index set;
    }
}
    Uac-auxiliary parameter set 2 (corresponding to access class 3): {
    UAC Bar Scale Factor X2;
    UAC Bar Time Factor Y2;
    RACH resource set: {
    Dedicated RACH Occasion;
    Dedicated preamble index set;
    }
}

UAC Bar Scale Factor X1 represents a probability factor included in the auxiliary parameter set 1, UAC Bar Time Factor Y1 represents a time factor included in the auxiliary parameter set 1, and a RACH resource included in the auxiliary parameter set 1 includes a dedicated RACH occasion and a dedicated preamble index set. UAC Bar Scale Factor X2 represents a probability factor included in the auxiliary parameter set 2, UAC Bar Time Factor Y2 represents a time factor included in the auxiliary parameter set 2, and a RACH resource included in the auxiliary parameter set 2 includes a dedicated RACH occasion and a dedicated preamble index set.

Alternatively, if the first indication information indicates that an auxiliary parameter set is configured for one or more access identities, a quantity of bits included in the bitmap may be equal to a total quantity of access identities that need to be indicated. For example, the first indication information in this case may be represented as uac-accessidentitybitmap. For example, the access identity of the first category in this embodiment of this application includes the access identity 3 to the access identity 10, and there are 8 access classes in total. In this case, the bitmap may include 8 bits, and the 8 bits are in a one-to-one correspondence with the 8 access identities. For example, if a value of a bit in the bitmap is "1", it indicates that an auxiliary parameter set is configured for an access identity corresponding to the bit; or if a value of a bit in the bitmap is "0", it indicates that no auxiliary parameter set is configured for an access identity corresponding to the bit. For example, if the bitmap is "01010000", it indicates that the network separately configures an auxiliary parameter set for the accessidentity 3 and the access identity 5, but does not configure an auxiliary parameter set for another access identity. For example, the network device sends the first indication information and the at least one auxiliary parameter set in one message. The message is referred to as a first message. The first message is, for example, a SIB1, or may be another message. In this case, the SIB1 may include a bitmap and an auxiliary parameter set indicated by the bitmap. For example, if the bitmap included in the SIB is "01010000", the SIB1 further includes an auxiliary parameter set corresponding to the access identity 3 and an auxiliary parameter set corresponding to the access identity 5.

Certainly, in addition to the bitmap, the first indication information may be implemented in another manner. For example, if the first indication information indicates that an auxiliary parameter set is configured for one or more access classes, the first indication information may include an access class number (that is, a number of an access class or an ID of the access class). In this case, an access class corresponding to an access class number included in the first indication information is an access class for which an auxiliary parameter set is configured, and an access class corresponding to an access class number not included in the first indication information is an access class for which no auxiliary parameter set is configured. For another example, if the first indication information indicates that an auxiliary parameter set is configured for one or more access identities, the first indication information may include an access identity number (that is, a number of the access identity, or an ID of the access identity). In this case, an access identity corresponding to the access identity number included in the first indication information is an access identity for which the auxiliary parameter set is configured, and an access identity corresponding to an access identity number not included in the first indication information is an access identity for which no auxiliary parameter set is configured.

Alternatively, an access class or an access identity for which an auxiliary parameter set is configured may be predefined, or may be specified in a protocol, and therefore does not need to be notified by the network device. Alternatively, no auxiliary parameter set may be configured for the access class or the access identity. Therefore, S24 is an optional step, and is not mandatory.

S25: The UE determines that the UE corresponds to a first auxiliary parameter set. For example, the UE determines, based on the first indication information and the access identity or the access class of the UE, that the UE corresponds to the first auxiliary parameter set.

After receiving the first indication information, the UE may determine the access class indicated by the first indication information. If the access class of the UE is one of the access classes indicated by the first indication information, the UE may determine that the UE corresponds to the first auxiliary parameter set in the at least one auxiliary parameter set. Alternatively, after receiving the first indication information, the UE may determine the access identity indicated by the first indication information. If the access identity of the UE is one of the access identities indicated by the first indication information, the UE may determine that the UE corresponds to the first auxiliary parameter set in the at least one auxiliary parameter set.

If the network device does not send the first indication information, for example, an access class or an access identity for which an auxiliary parameter set is configured is predefined, or is specified in a protocol, the UE may determine, based on the access identity or the access class of the UE, the auxiliary parameter set corresponding to the UE, for example, the first auxiliary parameter set.

If no auxiliary parameter set is configured for the access class or the access identity, the UE does not need to determine the auxiliary parameter set corresponding to the UE. Therefore, S25 is an optional step.

S26: The UE determines, based on the first access control parameter set, whether the UE is allowed to access the first cell, or the UE determines, based on the first access control parameter set and the first auxiliary parameter set, whether the UE is allowed to access the first cell.

If the UE does not determine the auxiliary parameter set, for example, no auxiliary parameter set is configured for the access identity or the access class of the UE, or the network device does not additionally configure an auxiliary parameter set for the access class or the access identity (S23, S24, and S25 are not performed), the UE determines, based on the first access control parameter set, whether the UE is allowed to access the first cell. For a manner in which the UE determines, based on the first access control parameter set, whether the UE is allowed to access the first cell, refer to related descriptions in the foregoing descriptions of parameters included in the access control parameter set.

Alternatively, if the UE further determines the first auxiliary parameter set, the first auxiliary parameter set includes the first threshold, and the value of the first parameter measured by the UE is greater than or equal to the first threshold, the UE still determines, based on the first access control parameter set, whether the UE is allowed to access the first cell.

Alternatively, if the UE further determines the first auxiliary parameter set, and the first auxiliary parameter set does not include the first threshold, or the first auxiliary parameter set includes the first threshold, and the value of the first parameter measured by the UE is less than the first threshold, the UE may determine, based on the first auxiliary parameter set and the first access control parameter set, whether the UE is allowed to access the first cell. For a manner in which the UE determines, based on the first auxiliary parameter set and the first access control parameter set, whether the UE is allowed to access the first cell, refer to related descriptions in the foregoing descriptions of parameters included in the auxiliary parameter set.

If the UE is allowed to access the first cell, the UE may perform random access to the first cell. If the UE determines, based on the first access control parameter set, that the UE is allowed to access the first cell, the UE may select a corresponding random access resource to perform random access to the first cell. Alternatively, if the UE determines, based on the first auxiliary parameter set and the first access control parameter set, that the UE is allowed to access the first cell, and the first auxiliary parameter set includes the random access resource information, the UE may perform random access to the first cell by using the random access resource indicated by the random access resource information.

In this embodiment of this application, the access class allocated to the terminal device is the access class of the first category. However, the access class of the first category corresponds to the access identity of the first category. That is, the access class of the first category may correspond to a new access identity. Correspondingly, different access classes (or different access identities) are applicable to different access control parameters. Therefore, when access control is performed on these terminal devices, different access control parameters may be applied to different terminal devices for separate access control, to implement differentiated control at a finer granularity. For example, a terminal device required by a network or a terminal device that more needs to access a network can preferentially access the network, thereby meeting requirements of the terminal device and the network.

Next, an embodiment of this application provides a second communication method. FIG. 3 is a flowchart of the method. The following description process uses an example in which the method is applied to the network architecture shown in FIG. 1.

For ease of description, an example in which the method is performed by a network device and UE is used below. This embodiment of this application is applied to the network architecture shown in FIG. 1. Therefore, the network device described below is, for example, the access network device in the network architecture shown in FIG. 1, and the UE described below may be the UE in the network architecture shown in FIG. 1.

S31: The network device sends at least one access control parameter set, and correspondingly, the UE receives the at least one access control parameter set from the network device. For example, if the network device sends the at least one access control parameter set in a first cell, the UE may receive the at least one access control parameter set in the first cell. The first cell is a cell in which the UE is to initiate random access. In other words, the UE expects to initiate random access in the first cell.

Before accessing the network device, the UE may receive the at least one access control parameter set. For example, the network device may send the at least one access control parameter set in the first cell by using a system message. The system message is, for example, a SIB1, or may be another system message. In this case, the UE receives the system message in the first cell, to obtain the at least one access control parameter set. An access control parameter set corresponds to an access category. For example, each access control parameter set in the at least one access control parameter set corresponds to one access category. With reference to Table 2, the UE may determine, based on a service initiated by the UE for access, an access category of the UE, so that the UE may determine an access control parameter set corresponding to the UE. In addition, an access control parameter set has an applicable access identity. In this embodiment of this application, no new access class may be allocated to the UE, and the UE continues to apply an original access class. In this case, the UE may determine an access identity of the UE based on the access class of the UE. In conclusion, the UE can determine, based on the access category of the UE, the access control parameter set corresponding to the UE, and then determine, based on the access identity of the UE, whether the UE applies the access control parameter set. If the UE applies the access control parameter set, the UE may determine, based on the access control parameter set, whether the UE is allowed to access the network device, or determine whether the UE is allowed to access the first cell.

Alternatively, in this embodiment of this application, a new access class may be allocated to the UE. For example, different access classes may be allocated to different types of UEs. An access class allocated to the UE may be the access class of the first category, or an access class of a common user. For the access class of the first category, refer to related descriptions in the embodiment shown in FIG. 2. Different from the embodiment shown in FIG. 2, in this embodiment of this application, if access classes are allocated to the UE, corresponding access identities may not be configured for these access classes. In other words, a new access class allocated to the UE in this embodiment of this application does not correspond to any access identity. After the UE determines an access control parameter set based on the access category of the UE, because the access class of the UE does not correspond to any access identity, the UE considers that the UE can apply the access control parameter set. In other words, if a new access class is allocated to the UE in this embodiment of this application, the UE can apply the at least one access control parameter set.

The UE to which this embodiment of this application is applicable is, for example, redcap UE. Alternatively, in this embodiment of this application, the UE participating in classification may further include another UE, for example, may further include another UE with a limited capability other than the redcap UE, or may further include common UE, or referred to as legacy UE, that is, UE whose capability is not limited.

In this embodiment of this application, an access control parameter set may include a barring factor and access barring time. For descriptions of the two parameters, refer to the descriptions of the embodiment shown in FIG. 2.

S32: The UE determines, based on the access identity of the UE, that the UE applies the first access control parameter set in the at least one access control parameter set.

For more content of S32, refer to the descriptions of S22 in the embodiment shown in FIG. 2.

S33: The network device sends an auxiliary parameter set, and correspondingly, the UE receives the auxiliary parameter set from the network device. There may be one or more auxiliary parameter sets.

The network device may send the auxiliary parameter set by using a system message. For example, the system message is a SIB1. In other words, the network device sends both the auxiliary parameter set and the at least one access control parameter set in the SIB1. Alternatively, the auxiliary parameter set may be sent by using another system message. Alternatively, the network device may send the auxiliary parameter set by using another broadcast message, or the network device may send the auxiliary parameter set by using a unicast message, to separately send the auxiliary parameter set to the corresponding UE.

In this embodiment of this application, the network device may send one or more auxiliary parameter sets, and the one or more auxiliary parameter sets is applicable to the redcap UE. It may be considered that, to better separately perform access control on the redcap UE and the legacy UE, an auxiliary parameter set may be configured for the redcap UE, to perform access control on the redcap UE by using the auxiliary parameter set. Through the auxiliary parameter set, the redcap UE can more easily perform access, or the redcap UE cannot easily perform access.

One auxiliary parameter set may include one or more of the following parameters: a probability factor, a time factor, random access resource information, or a first threshold. For content such as descriptions of these parameters, refer to the embodiment shown in FIG. 2.

Alternatively, the one or more auxiliary parameter sets may be predefined, or specified in a protocol, and therefore do not need to be sent by the network device. Alternatively, in this embodiment of this application, the auxiliary parameter set may not be configured, and the network device naturally does not need to send the auxiliary parameter set. Therefore, S33 is an optional step, and is not mandatory. If the auxiliary parameter set is not configured, the UE only needs to determine, according to an existing rule, whether the UE is allowed to access the first cell.

S34: The UE determines, based on the first access control parameter set, whether the UE is allowed to access the first cell, or the UE determines, based on the first access control parameter set and the first auxiliary parameter set, whether the UE is allowed to access the first cell. If the network device sends a plurality of auxiliary parameter sets and the UE receives the plurality of auxiliary parameter sets in S33, the first auxiliary parameter set may be one of the plurality of auxiliary parameter sets; or if the network device sends one auxiliary parameter set and the UE receives the auxiliary parameter set in S33, the first auxiliary parameter set is the auxiliary parameter set.

In this embodiment of this application, a new access class or access identity may be configured for the UE, and the UE may determine, based on the new access class or access identity, whether the UE applies the auxiliary parameter set. Alternatively, neither a new access class nor a new access identity may be configured for the UE, and the UE may continue to use the original access class and access identity. In this case, the UE may determine, in another manner, whether the UE applies the auxiliary parameter set. The following describes several manners in which the UE determines whether the auxiliary parameter set is applicable by using examples.

1. Configure neither a new access class nor a new access identity for the UE. In this case, the UE may use one of the following manners to determine whether the UE applies the auxiliary parameter set.

For example, first information is preconfigured in some UEs, and the first information indicates that the UE applies the auxiliary parameter set. In this case, the UE for which the first information is configured applies the auxiliary parameter set, and UE for which the first information is not configured does not apply the auxiliary parameter set. For example, in this embodiment of this application, the first information is preconfigured for the redcap UE, or the first information may be preconfigured for UE of another type.

For another example, the UE may determine, based on a capability of the UE, whether the auxiliary parameter set is applicable. For example, if the capability of the UE is lower than a first capability, the UE applies the auxiliary parameter set. Otherwise, the UE does not apply the auxiliary parameter set. For example, if the first capability is a bandwidth capability, and the bandwidth capability is 40 M, if the UE supports only a bandwidth of 20 M, the capability of the UE is lower than the first capability. For another example, if the first capability is an antenna capability, and the antenna capability is 2T4R, if an antenna supported by the UE is 1T1R or 1T2R, the capability of the UE is lower than the first capability.

For another example, the UE may determine, in a manner such as protocol predefinition (or preconfiguration in the UE), whether the auxiliary parameter set is applicable. For example, it is specified in the protocol that the auxiliary parameter set is applicable to a smart band and a smart watch, and the auxiliary parameter set is not applicable to UE in another application scenario. Alternatively, it is specified in the protocol that the auxiliary parameter set is applicable to both 1T1R and 1T2R, and the auxiliary parameter set is not applicable to UE that supports another quantity of antennas. Alternatively, it is specified in the protocol that the auxiliary parameter set is applicable to both the 20 M bandwidth and the 40 M bandwidth, and the auxiliary parameter set is not applicable to UE that supports another bandwidth. In this manner, the UE can determine, based on a protocol or preconfigured information, whether the UE applies the auxiliary parameter set.

For another example, the UE may determine, based on an application scenario of the UE, whether the UE applies the auxiliary parameter set. For example, it may be predefined that UE applicable to some scenarios can apply the auxiliary parameter set. These scenarios include, for example, a sensor, a smart band, or a smart watch. If the UE determines that the UE is a sensor, the UE can apply the auxiliary parameter set, and if the UE is a mobile terminal, the UE does not apply the auxiliary parameter set.

For another example, the UE may determine, based on an access class or an access identity (for example, the original access class or the original access identity) of the UE, the auxiliary parameter set applicable to the UE; or in a case in which the UE first determines whether the UE is redcap UE, the UE determines, based on the access class or the access identity, the auxiliary parameter set applicable to the UE.

In the foregoing several determining manners, the network device may send a plurality of auxiliary parameter sets. The auxiliary parameter sets correspond to access classes of the UE, and different access classes correspond to different auxiliary parameter sets. Therefore, the UE can select a corresponding auxiliary parameter set based on the access class of the UE. For example, one UE determines that the first auxiliary parameter set is an auxiliary parameter set corresponding to the access class of the UE. Alternatively, the network device may send an auxiliary parameter set. The auxiliary parameter set is unrelated to information such as an access class of the UE, and the same auxiliary parameter set is applicable to all UEs for which the first information is configured. Alternatively, the network device may send a plurality of auxiliary parameter sets. The auxiliary parameter sets correspond to access identities of the UE, and different access identities correspond to different auxiliary parameter sets. Therefore, the UE can select a corresponding auxiliary parameter set based on the access identity of the UE. For example, one UE determines that the first auxiliary parameter set is an auxiliary parameter set corresponding to the access identity of the UE. Alternatively, the network device may send an auxiliary parameter set. The auxiliary parameter set is unrelated to information such as the access identity of the UE, and the same auxiliary parameter set is applicable to all UEs to which the auxiliary parameter set is applicable. In addition, in the foregoing several cases, a same access class may correspond to different access categories. In this case, different access categories corresponding to the same access class may apply a same auxiliary parameter set, or may apply different auxiliary parameter sets. Alternatively, a same access identity may correspond to different access categories. In this case, different access categories corresponding to the same access identity may apply a same auxiliary parameter set, or may apply different auxiliary parameter sets.

2. Configure a new access class or a new access identity for the UE. In this case, the UE may use one of the following manners to determine whether the UE applies the auxiliary parameter set.

For example, in this embodiment of this application, a new access class may be configured for the UE, and the UE may determine, based on the access class, whether the UE applies the auxiliary parameter set. For example, in this embodiment of this application, an access class of a first category is allocated to the UE, and the access class of the first category does not explicitly indicate an access identity. For a description of the access class of the first category, refer to related content in the embodiment shown in FIG. 2. For example, new access class information of the UE may be configured in a SIM card of the UE, and the UE can determine, based on the access class information included in configuration information of the SIM card of the UE, whether the UE applies the auxiliary parameter set. For example, if the UE determines, based on the access class information included in the configuration information of the SIM card of the UE, that the access class of the UE is the access class of the first category, the UE determines that the UE applies the auxiliary parameter set. Otherwise, the UE determines that the UE does not apply the auxiliary parameter set. Alternatively, the new access class information of the UE may not be configured in the SIM card, and the UE may determine the access class of the UE in another manner. For example, a correspondence between the access class of the first category and an application scenario may be specified in a manner such as protocol predefinition (or preconfiguration in the UE). For example, it is specified that the smart band and the smart watch correspond to an access class 0, and the smartphone corresponds to an access class 1. Alternatively, a correspondence between an access identity of a first category and a quantity of antennas supported by the UE may be specified in a manner such as protocol predefinition (or preconfiguration in the UE). For example, it is specified that 1T1R corresponds to an access class 0, and 1T2R corresponds to an access class 1. Alternatively, a correspondence between the access class of the first category and a bandwidth of the UE may be specified in a manner such as protocol predefinition (or preconfiguration in the UE). For example, it is specified that 20 M corresponds to an access class 0, and 40 M corresponds to an access class 1. In the foregoing several manners, the UE can determine, based on a protocol or preconfigured information, the new access class corresponding to the UE.

In this case, the network device may send a plurality of auxiliary parameter sets. The auxiliary parameter sets correspond to the access class of the first category, and in the access class of the first category, different access classes correspond to different auxiliary parameter sets. Therefore, if the access class of the first category is configured for one UE, the UE can select a corresponding auxiliary parameter set based on an access class of the UE. For example, one UE determines that the first auxiliary parameter set is an auxiliary parameter set corresponding to the access class of the UE. Alternatively, the network device may send an auxiliary parameter set. The auxiliary parameter set is unrelated to information such as a specific access class of the UE, and the same auxiliary parameter set is applicable to all UEs for which the access class of the first category is configured. In addition, in this case, a same access class may correspond to different access categories. In this case, different access categories corresponding to the same access class may apply a same auxiliary parameter set, or may apply different auxiliary parameter sets. This feature is also applicable to the embodiment shown in FIG. 2.

For another example, in this embodiment of this application, a new access identity may be configured for the UE, and the UE may determine, based on the access identity, whether the UE applies the auxiliary parameter set. For example, in this embodiment of this application, the access identity of the first category is allocated to the UE, and the access identity of the first category may not correspond to any access class, or certainly may correspond to an access class. This is not limited in this embodiment of the present invention. For access identities included in the access identity of the first category, refer to related descriptions in the embodiment shown in FIG. 2. For example, new access identity information of the UE may be configured in a SIM card of the UE, and the UE can determine, based on the access identity information included in the configuration information of the SIM card of the UE, whether the UE applies the auxiliary parameter set. For example, if the UE determines, based on the access identity information included in the configuration information of the SIM card of the UE, that the access identity of the UE is the access identity of the first category, the UE determines that the UE applies the auxiliary parameter set. Otherwise, the UE determines that the UE does not apply the auxiliary parameter set. Alternatively, the new access identity information of the UE may not be configured in the SIM card, and the UE may determine the access identity of the UE in another manner. For example, a correspondence between the access identity of the first category and an application scenario may be specified in a manner such as protocol predefinition (or preconfiguration in the UE). For example, it is specified that the smart band and the smart watch correspond to an access identity 3, and the smartphone corresponds to an access identity 4. Alternatively, a correspondence between the access identity of the first category and a quantity of antennas supported by the UE may be specified in a manner such as protocol predefinition (or preconfiguration in the UE). For example, it is specified that 1T1R corresponds to an access identity 3, and 1T2R corresponds to an access identity 4. Alternatively, a correspondence between the access identity of the first category and a bandwidth of the UE may be specified in a manner such as protocol predefinition (or preconfiguration in the UE). For example, it is specified that 20 M corresponds to an access identity 3, and 40 M corresponds to an access identity 4. In the foregoing several manners, the UE can determine, based on a protocol or preconfigured information, the new access identity corresponding to the UE.

In this case, the network device may send a plurality of auxiliary parameter sets. The auxiliary parameter sets correspond to the access identity of the first category, and in the access identity of the first category, different access identities correspond to different auxiliary parameter sets. Therefore, if the access identity of the first category is configured for one UE, the UE can select a corresponding auxiliary parameter set based on an access identity of the UE. For example, one UE determines that the first auxiliary parameter set is an auxiliary parameter set corresponding to the access identity of the UE. Alternatively, the network device may send an auxiliary parameter set. The auxiliary parameter set may be unrelated to information such as a specific access identity of the UE, and the same auxiliary parameter set is applicable to all UEs for which the access identity of the first category is configured. In addition, in this case, a same access identity may correspond to different access categories. In this case, different access categories corresponding to the same access identity may apply a same auxiliary parameter set, or may apply different auxiliary parameter sets. This feature is also applicable to the embodiment shown in FIG. 2.

Alternatively, the UE may determine, in another manner, whether the UE applies the auxiliary parameter set. A specific manner is not limited.

In this case, for example, if the UE applies the first auxiliary parameter set, the UE may determine, based on the first auxiliary parameter set and the first access control parameter set, whether the UE is allowed to access the first cell. If the UE does not apply the first auxiliary parameter set, for example, the UE is legacy UE, the UE may determine, based on the first access control parameter set, whether the UE is allowed to access the first cell without using the auxiliary parameter set. For content included in the auxiliary parameter set, refer to the descriptions of the embodiment shown in FIG. 2. For a manner in which the UE determines, with reference to the auxiliary parameter set and the access control parameter set, whether the UE is allowed to access a cell, refer to the descriptions of the embodiment shown in FIG. 2.

In this embodiment of this application, an auxiliary parameter set may be configured for some UEs. For example, an auxiliary parameter set is configured for the redcap UE, so that the redcap UE can determine, by using the auxiliary parameter set, whether the redcap UE is allowed to access a cell. In this way, access control is separately performed on the redcap UE and the legacy UE, so that a control granularity is finer.

With reference to the accompanying drawings, the following describes apparatuses configured to implement the foregoing methods in embodiments of this application. Therefore, all the foregoing content may be used in the following embodiments. Repeated content is not described again.

FIG. 4 is a schematic block diagram of a communication apparatus 400 according to an embodiment of this application. For example, the communication apparatus 400 is, for example, a terminal device or a network device. For example, the communication apparatus 400 can implement functions of the terminal device in the embodiment shown in FIG. 2 or the embodiment shown in FIG. 3. Alternatively, the communication apparatus 400 can implement functions of the network device in the embodiment shown in FIG. 2 or the embodiment shown in FIG. 3.

The communication apparatus 400 includes a transceiver unit 420 and a processing unit 410. Optionally, the communication apparatus 400 may further include a storage unit, and the storage unit can communicate with the processing unit 410, which is not shown in FIG. 4. Alternatively, the communication apparatus 400 may not include a storage unit, or the storage unit may be located outside the communication apparatus 400. For example, the communication apparatus 400 may be a terminal device, or may be a chip applied to a terminal device or another combined component or component that has a function of the foregoing terminal device. Alternatively, the communication apparatus 400 may be a network device, or may be a chip applied to a network device or another combined component or component that has a function of the foregoing network device. When the communication apparatus 400 is a terminal device or a network device, the processing unit 410 may include a processor, for example, a baseband processor. The baseband processor may include one or more central processing units (CPUs). The transceiver unit 420 may be a transceiver. The transceiver may include an antenna, a radio frequency circuit, and the like. The transceiver may include a transmitter and a receiver. The transceiver may implement functions of the transmitter and the receiver. Alternatively, the transmitter and the receiver may be two separately deployed function modules, but the two function modules are collectively referred to as a transceiver in this embodiment of this application. When the communication apparatus 400 is a component having a function of the foregoing terminal device or network device, the transceiver unit 420 may be a radio frequency unit, and the processing unit 410 may be a processor, for example, a baseband processor. When the communication apparatus 400 is a chip system, the transceiver unit 420 may be an input/output interface of a chip (for example, a baseband chip), and the processing unit 410 may be a processor of the chip system, and may include one or more central processing units. It should be understood that the processing unit 410 in this embodiment of this application may be implemented by a processor or a processor-related circuit component, and the transceiver unit 420 may be implemented by a transceiver or a transceiver-related circuit component.

In an implementation, when the communication apparatus 400 is configured to implement the functions of the terminal device in the embodiment shown in FIG. 2, the processing unit 410 may be configured to perform all operations other than receiving and sending operations performed by the terminal device in the embodiment shown in FIG. 2, for example, S22, S25, and S26, and/or another process used to support the technology described in this specification. The transceiver unit 420 may be configured to perform all receiving operation and sending operations performed by the terminal device in the embodiment shown in FIG. 2, for example, S21, S23, and S24, and/or configured to support another process of the technology described in this specification.

In an implementation, when the communication apparatus 400 is configured to implement the functions of the terminal device in the embodiment shown in FIG. 3, the processing unit 410 may be configured to perform all operations other than receiving and sending operations performed by the terminal device in the embodiment shown in FIG. 3, for example, S32 and S34, and/or configured to support another process of the technology described in this specification. The transceiver unit 420 may be configured to perform all receiving operations and sending operations performed by the terminal device in the embodiment shown in FIG. 3, for example, S31 and S33, and/or configured to support another process of the technology described in this specification.

In an implementation, when the communication apparatus 400 is configured to implement the functions of the network device in the embodiment shown in FIG. 2, the processing unit 410 may be configured to perform all operations other than receiving and sending operations performed by the network device in the embodiment shown in FIG. 2, for example, an operation of determining at least one auxiliary parameter set, and/or configured to support another process of the technology described in this specification. The transceiver unit 420 may be configured to perform all receiving operation and sending operations performed by the network device in the embodiment shown in FIG. 2, for example, S21, S23, and S24, and/or configured to support another process of the technology described in this specification.

In an implementation, when the communication apparatus 400 is configured to implement the functions of the network device in the embodiment shown in FIG. 3, the processing unit 410 may be configured to perform all operations other than receiving and sending operations performed by the network device in the embodiment shown in FIG. 3, for example, an operation of determining an auxiliary parameter set, and/or configured to support another process of the technology described in this specification. The transceiver unit 420 may be configured to perform all receiving operations and sending operations performed by the network device in the embodiment shown in FIG. 3, for example, S31 and S33, and/or configured to support another process of the technology described in this specification.

In addition, the transceiver unit 420 may be a function module, and the function module can complete both a sending operation and a receiving operation. For example, the transceiver unit 420 may be configured to perform all sending operations and receiving operations performed by the terminal device or the network device in the embodiment shown in FIG. 2 or the embodiment shown in FIG. 3. For example, when a receiving operation is performed, the transceiver unit 420 may be considered as a receiving unit, and when a sending operation is performed, the transceiver unit 420 may be considered as a sending unit. Alternatively, the transceiver unit 420 may be two function modules. The transceiver unit 420 may be considered as a generic term of the two function modules. The two function modules include a receiving unit and a sending unit. The sending unit is configured to complete a sending operation. For example, the transceiver unit 420 may be configured to perform all sending operations performed by the terminal device or the network device in the embodiment shown in FIG. 2 or the embodiment shown in FIG. 3. The receiving unit is configured to complete a receiving operation. For example, the receiving unit may be configured to perform all receiving operations performed by the terminal device or the network device in the embodiment shown in FIG. 2 or the embodiment shown in FIG. 3.

For specific functions that can be implemented by the processing unit 410 and the transceiver unit 420, refer to the descriptions of the operations performed by the terminal device in the embodiment shown in FIG. 2 or the embodiment shown in FIG. 3, or refer to the descriptions of the operations performed by the network device in the embodiment shown in FIG. 2 or the embodiment shown in FIG. 3. Details are not described again.

An embodiment of this application further provides a communication apparatus. The communication apparatus may be a terminal device, or may be a circuit. The communication apparatus may be configured to perform the actions performed by the terminal device in the foregoing method embodiments.

Figure 5:
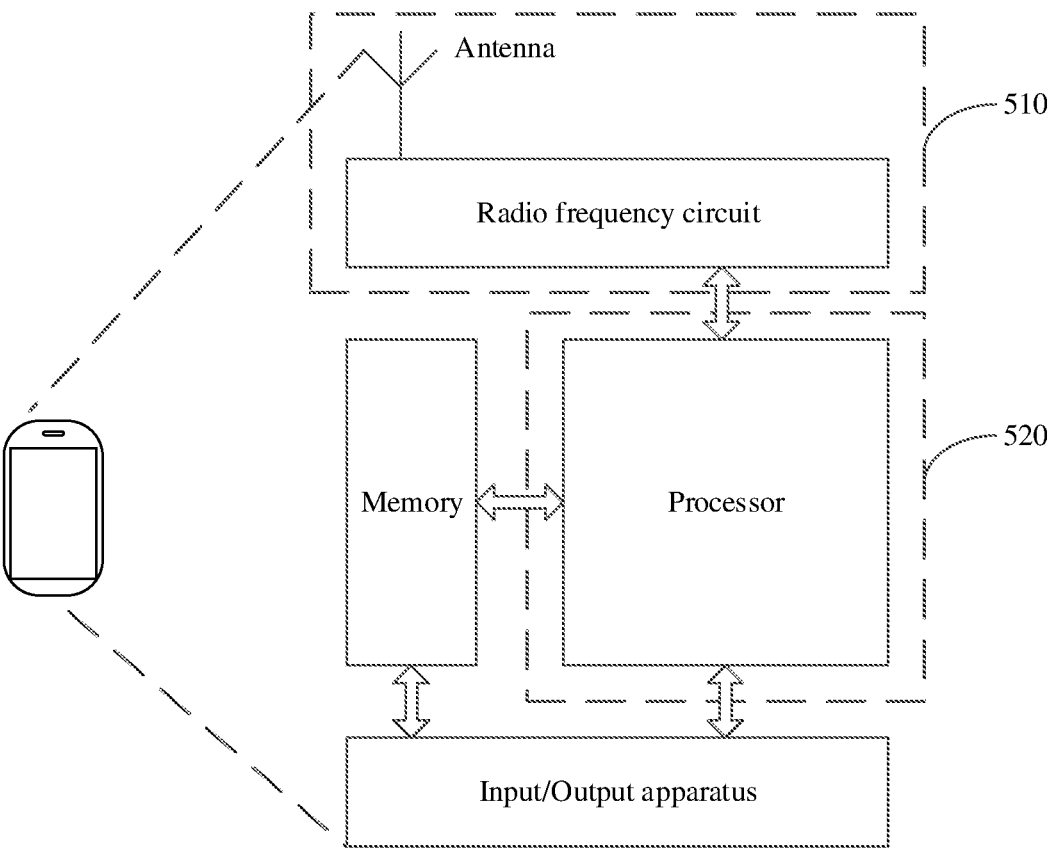
FIG. 5 is a schematic block diagram of another communication apparatus according to an embodiment of this application.

When the communication apparatus is the terminal device, FIG. 5 is a simplified schematic diagram of a structure of the terminal device. For ease of understanding and convenience of figure illustration, an example in which the terminal device is a mobile phone is used in FIG. 5. As shown in FIG. 5, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, only one memory and one processor are shown in FIG. 5. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be one functional unit, and the functional unit can implement a sending function and a receiving function; or the transceiver unit may include two functional units: a receiving unit that can implement a receiving function and a sending unit that can implement a sending function), and the processor that has a processing function may be considered as a processing unit of the terminal device. As shown in FIG. 5, the terminal device includes a transceiver unit 510 and a processing unit 520. The transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit. That is, the transceiver unit 510 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 510 is configured to perform the sending operation and the receiving operation on the terminal device side in the embodiment shown in FIG. 2 or the embodiment shown in FIG. 3, and the processing unit 520 is configured to perform another operation other than the sending and receiving operation on the terminal device side in the embodiment shown in FIG. 2 or the embodiment shown in FIG. 3.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application provides a first communication system. The communication system may include the terminal device in the embodiment shown in FIG. 2, and include the network device in the embodiment shown in FIG. 2. The terminal device or the network device is implemented, for example, by using the communication apparatus 400 in FIG. 4.

An embodiment of this application provides a second communication system. The communication system may include the terminal device in the embodiment shown in FIG. 3, and include the network device in the embodiment shown in FIG. 3. The terminal device or the network device is implemented, for example, by using the communication apparatus 400 in FIG. 4.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing computer-readable storage medium may be any usable medium that can be accessed by a computer. For example instead of limitation, the computer-readable medium may include a random access memory (RAM), a read-only memory (ROM), a programmable read-only memory (PROM), an erasable programmable read-only memory (EPROM), an electrically erasable programmable read-only memory (EEPROM), a compact disc read-only memory (CD-ROM), a universal serial bus flash disk, a removable hard disk, another optical disc storage medium, disk storage medium, or another magnetic storage device, or any other medium that can be used to carry or store expected program code in a form of an instruction or a data structure and that can be accessed by a computer. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, performed by a terminal device or a chip configured for a terminal device, wherein the method comprises:

receiving at least one access control parameter set and at least one auxiliary parameter set;

determining a first access control parameter set is applicable to the terminal device, wherein the first access control parameter set comprises a barring factor and an access barring time and the at least one access control parameter set comprises the first access control parameter set;

determining, based on the terminal device being of an access identity of a first category and a first auxiliary parameter set being applicable to the first category, the first auxiliary parameter set being applicable to the terminal device, wherein the first auxiliary parameter set comprises an access barring probability and the at least one auxiliary parameter set comprises the first auxiliary parameter set; and determining, based on the access barring probability, whether the terminal device is allowed to access a first cell, wherein the first cell is a cell in which the terminal device receives the first access control parameter set and the first auxiliary parameter set.

2. The method according to claim 1, further comprising: determining that the access identity of the terminal device is the access identity of the first category based on a predefined correspondence between the access identity of the first category and an application scenario of the terminal device.

3. The method according to claim 1, wherein an access control parameter included in the first access control parameter set comprises an access identity control parameter for indicating an access identity to which the first access control parameter set is applicable.

4. The method according to claim 1, wherein the first access control parameter set corresponds to an access category of the terminal device, the first auxiliary parameter set corresponds to the access category of the terminal device; and wherein determining the first access control parameter set is applicable to the terminal device comprises: based on the access identity of the terminal device and the access category of the terminal device.

5. The method according to claim 1, wherein the at least one access control parameter set and the at least one auxiliary parameter set are included in a system information block received from a network device.

6. The communication method of claim 1, further comprising:

determining, based on the access identity without using an access category, that the terminal device applies the first access control parameter set;

wherein a first terminal device belongs to a first type, terminal devices of a same type have a same access class, and terminal devices of different types meet one or more of the following conditions:

the terminal devices of different types support different bandwidths;

the terminal devices of different types support different quantities of antennas;

the terminal devices of different types have different application scenarios;

the terminal devices of different types support different maximum data transmission rates; or the terminal devices of different types support different maximum transport block sizes.

7. The method according to claim 1, wherein the access identity of the first category is an access identity for user equipment (UE) for which a disaster condition applies.

8. The method according to claim 1, wherein the method further comprises:

in response to determining that the terminal device is barred from accessing the first cell, starting a timer, wherein a duration of the timer is set based on the access barring time.

9. The method according to claim 8, wherein during the duration of the timer, the terminal device is barred from accessing the first cell.

10. A non-transitory computer-readable storage medium, wherein the computer-readable storage medium is configured to store a computer program, and when the computer program is run on a computer, the computer is caused to perform the method according to claim 1.

11. A chip, comprising one or more processors and a communication interface, wherein the one or more processors are configured to read instructions, to perform the method according to claim 1.

12. A terminal device, comprising:

one or more processors;

one or more non-transitory memories; and one or more computer programs, wherein the one or more computer programs are stored in the one or more memories, the one or more computer programs comprise instructions, and when the instructions are executed by the one or more processors in the terminal device, the terminal device is caused to perform the method according to claim 1.

13. A communication method, performed by a network device or a chip configured for a network device, wherein the method comprises:

determining at least one access control parameter set and at least one auxiliary parameter set, wherein the at least one access control parameter set and the at least one auxiliary parameter set are used to determine whether a terminal device is allowed to access a first cell, wherein the at least one access control parameter set comprises a first access control parameter set, the first access control parameter set comprising a barring factor and an access barring time, wherein the at least one auxiliary parameter set comprises a first auxiliary parameter set, the first auxiliary parameter set comprising an access barring probability and being applicable to terminal devices of an access identity of a first category, wherein the access barring probability is used to determine whether the terminal device is allowed to access the first cell; and sending the at least one access control parameter set and at least one auxiliary parameter set.

14. The method according to claim 13, wherein an access control parameter included in the first access control parameter set comprises an access identity control parameter for indicating an access identity to which the at least one access control parameter set is applicable.

15. The method according to claim 13, wherein the first auxiliary parameter set corresponds to the access identity of the terminal device and an access category of the terminal device, and the first access control parameter set corresponds to the access identity of the terminal device and the access category of the terminal device.

16. The method according to claim 13, wherein the at least one access control parameter set and the at least one auxiliary parameter set are included in a system information block sent by the network device.

17. The method according to claim 13, wherein the access identity of the first category is an access identity for user equipment (UE) for which a disaster condition applies.

18. The method according to claim 13, wherein the access barring time is configured to set a duration of a timer used by the terminal device when the terminal device is barred from accessing the first cell.

19. The method according to claim 18, wherein the access barring time is configured such that during the duration of the timer, the terminal device is barred from accessing the first cell.

20. A network device, comprising:

one or more processors;

one or more non-transitory memories; and one or more computer programs, wherein the one or more computer programs are stored in the one or more memories, the one or more computer programs comprise instructions, and when the instructions are executed by the one or more processors in the network device, the network device is caused to perform the method according to claim 13.

* * * * *